(12) United States Patent
Sykora et al.

(10) Patent No.: US 9,244,284 B2
(45) Date of Patent: Jan. 26, 2016

(54) MICROREPLICATED FILM FOR AUTOSTEREOSCOPIC DISPLAYS

(75) Inventors: Michael J. Sykora, New Richmond, WI (US); Robert L. Brott, Woodbury, MN (US); John C. Schultz, Afton, MN (US); Corey D. Balts, Eau Claire, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 280 days.

(21) Appl. No.: 13/048,204

(22) Filed: Mar. 15, 2011

(65) Prior Publication Data

US 2012/0236403 A1  Sep. 20, 2012

(51) Int. Cl.
G02B 27/22 (2006.01)
H04N 13/04 (2006.01)
F21V 8/00 (2006.01)

(52) U.S. Cl.
CPC ........ *G02B 27/2214* (2013.01); *G02B 27/2242* (2013.01); *H04N 13/0406* (2013.01); *G02B 6/0053* (2013.01); *G02B 27/2264* (2013.01)

(58) Field of Classification Search
CPC ........... G02B 27/2214; G02B 27/2242; H04N 13/0406; H04N 13/0404
USPC ......... 359/463, 462, 455, 456, 457, 458, 621, 359/625, 453; 362/606
See application file for complete search history.

(56) References Cited

U.S. PATENT DOCUMENTS

| | | | |
|---|---|---|---|
| 3,959,580 A | 5/1976 | Chocol | |
| 4,588,258 A | 5/1986 | Hoopman | |
| 5,661,599 A | 8/1997 | Borner | |
| 5,751,478 A * | 5/1998 | Yoshimura et al. | 359/453 |
| 6,400,504 B2 * | 6/2002 | Miyata | 359/453 |
| 6,825,985 B2 | 11/2004 | Brown et al. | |
| 7,210,836 B2 | 5/2007 | Sasagawa et al. | |
| 7,224,529 B2 | 5/2007 | King et al. | |
| 7,528,893 B2 | 5/2009 | Schultz et al. | |
| 7,530,721 B2 * | 5/2009 | Mi et al. | 362/606 |
| 8,659,830 B2 * | 2/2014 | Brott et al. | 359/463 |

(Continued)

FOREIGN PATENT DOCUMENTS

| | | |
|---|---|---|
| DE | 102007043574 | 4/2009 |
| JP | 2005-266293 | 9/2005 |

(Continued)

OTHER PUBLICATIONS

U.S. Appl. No. 12/643,503, "Optical Films Enabling Autostereoscopy", filed Dec. 21, 2009.

(Continued)

*Primary Examiner* — Audrey Y Chang

(57) ABSTRACT

An optical light redirecting film that can be made by microreplication, and that is suitable for use in an autostereoscopic backlight or display, includes opposed first and second structured surfaces. The first structured surface includes lenticular features and the second structured surface includes prismatic features. In some cases, at least a first prismatic feature has a first prism optical axis that is tilted relative to a thickness axis of the film perpendicular to the film plane. In some cases, at least a first lenticular feature has a first lenticular optical axis that is tilted relative to the thickness axis. In some cases, the film may have a central film caliper (thickness) at a central portion of the film and an edge film caliper at a first edge portion of the film, the central film caliper being greater than the edge film caliper.

20 Claims, 17 Drawing Sheets

(56) References Cited

U.S. PATENT DOCUMENTS

| | | | |
|---|---|---|---|
| 2005/0052750 A1 | 3/2005 | King et al. | |
| 2005/0270645 A1 | 12/2005 | Cossairt et al. | |
| 2005/0275952 A1 | 12/2005 | Odagiri | |
| 2006/0050197 A1 | 3/2006 | Hu | |
| 2007/0183033 A1* | 8/2007 | Schwerdtner | 359/463 |
| 2007/0242479 A1 | 10/2007 | Ohta et al. | |
| 2007/0268590 A1 | 11/2007 | Schwerdtner | |
| 2008/0084518 A1 | 4/2008 | Brott et al. | |
| 2008/0084519 A1 | 4/2008 | Brigham et al. | |
| 2008/0259634 A1 | 10/2008 | Mi et al. | |
| 2009/0219432 A1 | 9/2009 | Palum et al. | |
| 2009/0316058 A1 | 12/2009 | Huizinga et al. | |
| 2010/0027113 A1* | 2/2010 | Shin et al. | 359/463 |
| 2010/0128187 A1 | 5/2010 | Brott et al. | |
| 2012/0154450 A1* | 6/2012 | Aho et al. | 345/690 |

FOREIGN PATENT DOCUMENTS

| | | |
|---|---|---|
| JP | 2005266293 A * | 9/2005 |
| JP | 2008-304700 | 12/2008 |
| WO | WO 94/24589 | 10/1994 |
| WO | WO 2009/101558 | 8/2009 |

OTHER PUBLICATIONS

U.S. Appl. No. 12/849,531, "Scanning Backlight with Slatless Light Guide", filed Aug. 3, 2010.

U.S. Appl. No. 12/786,056, "Directional Backlight with Reduced Crosstalk", filed May 24, 2010.

U.S. Appl. No. 12/908,801, "Microreplicated Film for Attachment to Autostereoscopic Display Components", filed Oct. 20, 2010.

U.S. Appl. No. 12/969,995, "Dual Orientation Autostereoscopic Backlight and Display", filed Dec. 16, 2010.

Supplementary European Search Report for EP 12757589, completed Aug. 4, 2014.

* cited by examiner

MICROREPLICATED FILM FOR AUTOSTEREOSCOPIC DISPLAYS

FIELD OF THE INVENTION

This invention relates generally to microstructured optical films for use in autostereoscopic displays, as well as articles and systems that incorporate such films, and methods pertaining to such films.

BACKGROUND

A stereoscopic display usually presents an observer with images with parallax from individual right and left eye viewpoints. There are several techniques of providing the two eyes of the observer with the parallax images to produce a stereoscopic viewing experience. In a first technique, the observer utilizes a pair of shutter or 3-dimensional ("3D") glasses which transmit or block light from the viewer's eyes in synchronization with alternating the left/right image display. In a second technique, right eye and left eye images are alternatively displayed and directed towards the respective eyes of the observer but without the use of 3D glasses. This second technique is referred to as autostereoscopic, and is advantageous for 3D viewing because there is no need for the observer to wear any type of specialized glasses.

Autostereoscopic displays typically include a display panel, a specially designed backlight, and a specially designed light redirecting optical film disposed between the backlight and the display panel. The backlight provides a light guide having a light output area of nominally the same size as the display panel. Light sources disposed along opposite edges of the light guide are alternatively energized, causing the output area of the light guide to emit light alternatively at two different highly oblique angles. This light emitted by the light guide is intercepted by the light redirecting film (sometimes also referred to herein as 3D film), which converts the two different types of emitted light into alternating beams of light, one of which is directed to an observer's right eye and the other of which is directed to the observer's left eye. Placement of an electronically addressable display panel, such as an LCD panel, between the light redirecting film and the observer, and controlling the LCD panel to exhibit alternating right eye and left eye images in synchronization with the alternating light beams, allows the observer to perceive a 3-dimensional image.

BRIEF SUMMARY

We have developed a family of optical light redirecting (3D) films that can provide improved performance in autostereoscopic display applications, and/or that have unique optical and/or mechanical design characteristics. In some cases, the films incorporate prismatic features whose optical axes are tilted relative to a thickness axis of the film. The films may also incorporate lenticular features of compound curvature, whose optical axes are tilted relative to the thickness axis. The tilt angles of the prismatic features and/or of the lenticular features preferably change from one feature or group of features to the next across the face of the film, e.g., having a maximum tilt in one direction at one edge of the film, having little or no tilt in a central portion of the film, and having a maximum tilt in an opposite direction at an opposite edge of the film. The prismatic features may be paired with the lenticular features, such that a one-to-one correspondence of prismatic features and lenticular features is made. In some cases, a first lenticular feature may be paired with a first prismatic feature, and the lenticular feature may be tilted by an angle $\alpha$ and the prismatic feature may be tilted by an angle $\beta$, where $0<|\beta|<|\alpha|$, and preferably $|\beta|$ is about $|\alpha|/2$.

In some cases, the optical light redirecting films have a film caliper or thickness that changes over the working area of the film, e.g., the film thickness may be different (e.g. thicker) in a central portion of the film than at one or both edges of the film. The film thickness profile may be associated with the tilt of lenticular features on a structured surface of the film, such that larger angles of tilt of the lenticular features correspond to smaller thicknesses of the film, and smaller angles of tilt of the lenticular features (including lenticular features with no tilt) correspond to larger thicknesses of the film.

We therefore describe herein, among other things, light redirecting films suitable for use in autostereoscopic displays and backlights, the films defining a film plane and having opposed first and second structured surfaces. The first structured surface comprises lenticular features, e.g., an array of parallel linear or elongated lenticular structures, and the second structured surface comprises prismatic features, e.g., an array of parallel linear or elongated prismatic structures. Each of the prismatic features may have a prism optical axis, and a first one of the prismatic features may have a first prism optical axis that is tilted relative to a thickness axis of the film, the thickness axis being perpendicular to the film plane. Lenticular features are sometimes also referred to herein as lenses, and prismatic features are sometimes referred to herein as prisms.

The lenticular features may each extend parallel to an in-plane lenticular axis, and the prismatic features may each extend parallel to an in-plane prismatic axis. The prismatic axis may be perpendicular to the first prism optical axis. In some cases, the in-plane prismatic axis and the in-plane lenticular axis may be parallel to each other. In some cases, the first prism optical axis may be tilted at an angle $\beta$ relative to the thickness axis, and $\beta$ may be in a range from −30 to +30 degrees, for example. In some cases, a second one of the prismatic features may have a second prism optical axis that is substantially parallel to the thickness axis. In such cases, a third one of the prismatic features may have a third prism optical axis that is tilted relative to the thickness axis, and the tilt of the first prism optical axis may be of opposite polarity to the tilt of the third prism optical axis. Furthermore, the second prismatic feature may be disposed between the first and third prismatic features.

In some cases, the lenticular features may have compound curvatures, and each of the lenticular features may have a lenticular optical axis, which may also be a symmetry axis of the lenticular feature. A first one of the lenticular features may have a first lenticular optical axis that is tilted relative to the thickness axis. The first lenticular optical axis may be tilted at an angle $\alpha$ relative to the thickness axis, and $\alpha$ may be in a range from −30 to +30 degrees. A second one of the lenticular features may have a second lenticular optical axis that is substantially parallel to the thickness axis. Furthermore, a third one of the lenticular features may have a third lenticular optical axis that is tilted relative to the thickness axis, and the tilt of the first lenticular optical axis may be of opposite polarity to the tilt of the third lenticular optical axis. Such a second lenticular feature may be disposed between the first and third lenticular features. The first lenticular feature may be paired with the first prismatic feature, and the first prism optical axis may be tilted at an angle $\beta$ relative to the thickness axis, and the first lenticular optical axis may be tilted at an angle $\alpha$ relative to the thickness axis, and the magnitude of $\beta$ may be greater than zero but less than the magnitude of α. In some cases, the magnitude of β may be about half the magnitude of α.

We also describe light redirecting films suitable for use in an autostereoscopic backlight, such films defining a film plane and having opposed first and second structured surfaces. The first structured surface comprises lenticular features and the second structured surface comprises prismatic features. The film has a central film thickness or caliper at a central portion of the film and a first edge film thickness at a first edge portion of the film, the central film thickness being greater than the first edge film thickness. The lenticular features may each extend parallel to an in-plane lenticular axis, and the film thickness may change along a given in-plane axis perpendicular to the in-plane lenticular axis. The film thickness may decrease monotonically along the given in-plane axis from the central portion of the film to the first edge portion of the film. The film may also have a second edge portion opposite the first edge portion, and the film thickness may also decrease monotonically along the given in-plane axis from the central portion of the film to the second edge portion of the film. Note that other thickness profiles are also contemplated, e.g., thicknesses that change in ways that are not monotonic from the central portion of the film to a given edge portion of the film.

In some cases, each of the prismatic features may have a prism optical axis, and a first one of the prismatic features may have a first prism optical axis that is tilted relative to a thickness axis of the film, the thickness axis being perpendicular to the film plane. The lenticular features may have compound curvatures, and each of the lenticular features may have a lenticular optical axis, and a first one of the lenticular features may have a first lenticular optical axis that is tilted relative to the thickness axis of the film.

Related methods, systems, and articles are also discussed. The disclosed films are preferably compatible with high volume (e.g. roll-to-roll) manufacturing methods. The structured surfaces of the films can be made using known microreplication techniques, e.g., by embossing or thermoforming a polymer film, or using a continuous cast-and-cure arrangement.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

In the figures, like reference numerals designate like elements.

DETAILED DESCRIPTION OF ILLUSTRATIVE EMBODIMENTS

We begin by describing autostereoscopic systems and articles (see e.g. FIGS. 1a through 4b) without discussing the design features summarized above. Such features are more fully described later in this detailed description section. The reader will understand that this application contemplates that any of the design features of any given embodiment disclosed herein can be combined with any design features of any other embodiment disclosed herein.

Figure 1A:
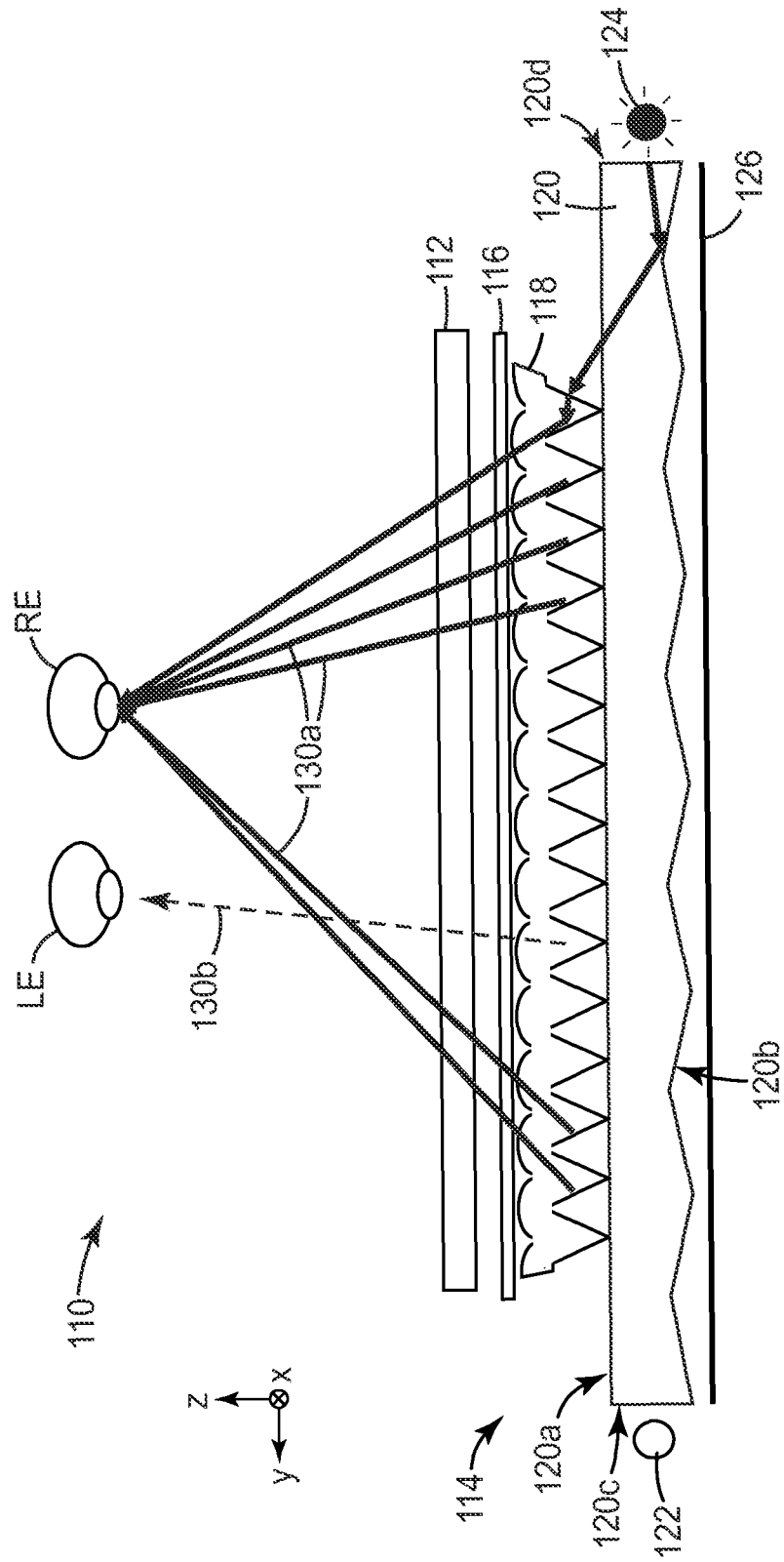
FIGS. 1a and 1b are schematic side views of a 3D autostereoscopic display device including a backlight, the display device capable of presenting different images to the right and left eyes.
Figure 1B:
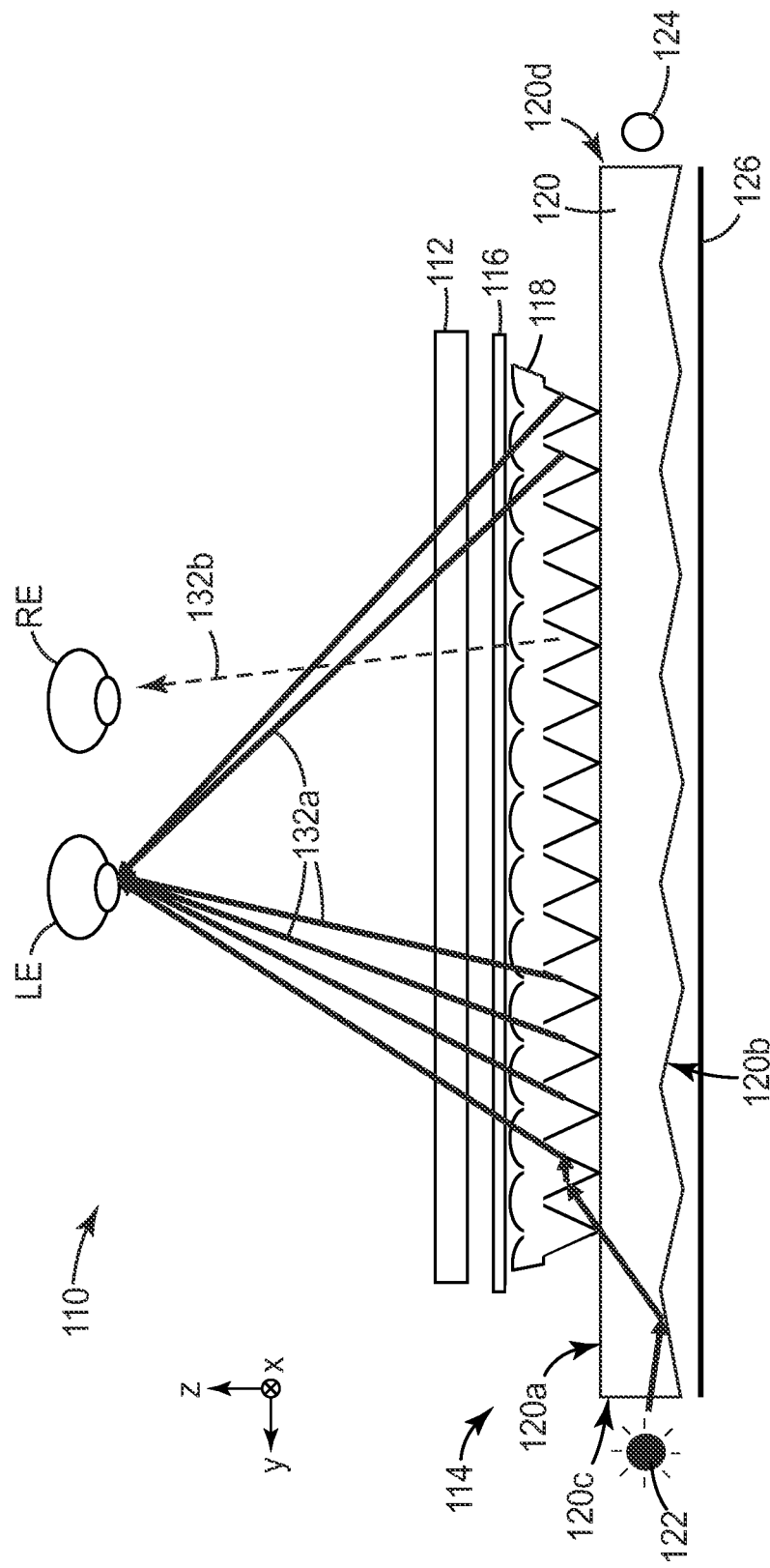

Turning then to FIGS. 1a and 1b, we see depicted some typical components of, as well as the basic operation of, a backlit autostereoscopic 3D display 110. In short, an observer having a left eye LE and a right eye RE views the display 110, and, by virtue of its construction and operation, perceives a 3-dimensional image. The display is depicted in the context of a Cartesian x-y-z coordinate system for ease of description, but the reader will understand that this does not limit the present disclosure to nominally planar displays, backlights, or light guides, for example.

The display 110 includes a liquid crystal panel 112 having individual pixels arranged in a matrix that defines an active or working area of the panel, the pixels being individually addressable by a controller (not shown). The controller sends control signals to the panel 112 to form any desired image, preferably in a colored or RGB (red-green-blue) sub-pixel format, in the active area of the panel 112. The display 110 is provided with a backlight, shown generally at 114, to make the image noticeable to the observer. The backlight 114 may be considered to include a polarizer 116, a 3D light redirecting film 118, a light guide 120, first and second light source assemblies 122, 124, respectively, and a back reflector 126. Some of these components, e.g. the back reflector 126 and/or the polarizer 116, may be omitted depending upon system requirements and design details, and other light management films or components, such as polarizing films (including reflective polarizing films), mirror films, diffusing films, multilayer optical films, window films, retarder films, prismatic brightness enhancement films, and other microstructured or non-microstructured films, may be added to the system as deemed appropriate by the system designer. Further, some components, such as the polarizer 116 and/or the redirecting film 118, may be considered to be part of the panel 112 rather than part of the backlight 114, or may be considered to be neither part of the backlight 114, nor part of the panel 112.

The light guide 120 is a key part of the backlight 114. The light guide has first and second major surfaces 120a, 120b, and first and second side surfaces 120c, 120d, as shown. The light guide receives light via the side surfaces 120c, 120d from the light source assemblies 122, 124, preferably in a sequential or alternating fashion, and causes the light from each of those assemblies to spread out, via multiple reflections, over an extended area of the light guide corresponding at least to a working area of the panel 112. As light from a given light source assembly traverses the length of the light guide, some of the light is extracted from the front or top surface (major surface 120a) of the light guide. This extracted light is typically highly oblique, e.g., peaking in luminance at about 70 degrees from the normal direction (z-axis) as measured in air, or having a peak luminance in a typical range from 50 to greater than 80 degrees, or from 60 to greater than 80 degrees. This highly oblique light is intercepted by the redirecting film 118, which is microstructured in such a way as to redirect the highly oblique light exiting the light guide 120 so that it is directed closer to the optical axis of the system, i.e., closer to the z-axis.

Due to the design of the light guide 120, light originating from the assembly 124 exits the surface 120a of the light guide at a highly oblique angle in a leftward-direction (closer to the +y direction) from the perspective of FIGS. 1a and 1b, while light originating from assembly 122 exits the surface 120a at a highly oblique angle in a rightward-direction (closer to the −y direction) from the same perspective. The redirecting film 118 is designed to redirect the oblique light originating from the assembly 124 in directions generally corresponding to light rays 130a, i.e., towards a right eye RE of the observer. The redirecting film 118 likewise redirects the oblique light originating from the assembly 122 in directions generally corresponding to light rays 132a, i.e., towards a left eye LE of the observer.

FIGS. 1a and 1b depict the display 110 at two different points in time. In FIG. 1a, light source assembly 124 is energized (turned "on") and light source assembly 122 is not (i.e. it is turned "off"), and in FIG. 1b, light source assembly 122 is energized and light source assembly 124 is not. The display is preferably controlled to alternate between these two illumination states. In synchrony with that alternating illumination, the controller causes the panel 112 to display a right-eye image when assembly 124 is energized, and a left-eye image when assembly 122 is energized. Rapid synchronous switching, e.g., switching frequencies of at least 90 Hz, or 100 Hz, or 110 Hz, or 120 Hz or more, between the right-eye image (and the assembly 124) and the left-eye image (and the assembly 122) allows the observer to perceive a stable 3D video image without requiring the observer to wear any special eyewear.

In the operation of the display 110, crosstalk occurs if light from the backlight reaches the left eye LE while the right-eye image is being displayed, and/or if light from the backlight reaches the right eye RE while the left-eye image is being displayed. Such crosstalk, which degrades the 3D viewing experience, is depicted by light ray 130b in FIG. 1a, and by light ray 132b in FIG. 1b.

Exemplary light guides are composed of a suitable light-transmissive material such as a polymer or glass. The light guide may be relatively rigid or flexible, and it may be relatively thin (e.g. in the form of a film) or thick. The light guide may have a substantially rectangular shape in plan view (refer e.g. to the perspective view of FIG. 3), but non-rectangular shapes may also be used. A back or rear major surface (see surface 120b in FIGS. 1a and 1b) of the light guide is preferably shaped to include a plurality of extraction elements; features such as linear lenticular features, or linear prism features are useful. In cases where linear prisms are used for the rear major surface, each of the linear prisms may extend in a direction parallel to the side surfaces 120c, 120d, i.e., parallel to the x-axis shown in the figure, although other orientations are also contemplated as discussed in commonly assigned U.S. application Ser. No. 12/969,995, "Duel Orientation Autostereoscopic Backlight and Display", filed Dec. 16, 2010. The linear prism features cause the back major surface (see surface 120b) to substantially redirect (e.g., reflect, extract, and the like) light, while the front major surface (see surface 120a) substantially transmits light. In some cases, a highly reflective surface on or adjacent the back major surface helps to redirect light out of the backlight through the front major surface. The front major surface of the light guide may be substantially flat, but is preferably structured with light spreading elements such as lenticular, prismatic, or similar features that spread the light in the vertical direction, i.e., in the x-z plane of FIG. 3. Further design details regarding light guides suitable for use in autostereoscopic backlights can be found in U.S. Pat. No. 7,210,836 (Sasagawa et al.), and U.S. Patent Application Publication US 2009/0316058 (Huizing a et al.). Reference is also made to U.S. Patent Application Publications US 2008/0084519 (Brigham et al.) and US 2010/0128187 (Brott et al.).

Exemplary light redirecting films (3D films) have structured or faceted features on both major surfaces of the film. The front major surface, which faces the observer, may comprise linear lenticular features. These lenticular features are preferably curved or lens-shaped in one cross-sectional plane, and may be flat or straight in an orthogonal cross-sectional plane. The back major surface of the film, which faces the light guide, may comprise linear prismatic features. The linear prismatic features are preferably parallel to each other, and they may be parallel to the linear lenticular features on the front surface of the film, although other orientations are also possible. In most cases, the redirecting film may be oriented such that the linear lenticular and prismatic features of the redirecting film are parallel to the prismatic features on the back major surface of the light guide, but other orientations may also be used, as discussed in the pending '995 U.S. application (Ser. No. 12/969,995) referenced above. The lenticular and prismatic features of the redirecting film are designed such that the highly oblique light emitted by the front major surface of the light guide is converted to more axially-directed light emitted at the proper angles such that an observer can perceive depth in the displayed image. Further design details of exemplary redirecting films can be found in one or more of the following documents: U.S. Pat. No. 7,210, 836 (Sasagawa et al.), and U.S. Patent Application Publications US 2005/0052750 (King et al.), US 2008/0084519 (Brigham et al.), and US 2009/0316058 (Huizing a et al.).

Figure 2:
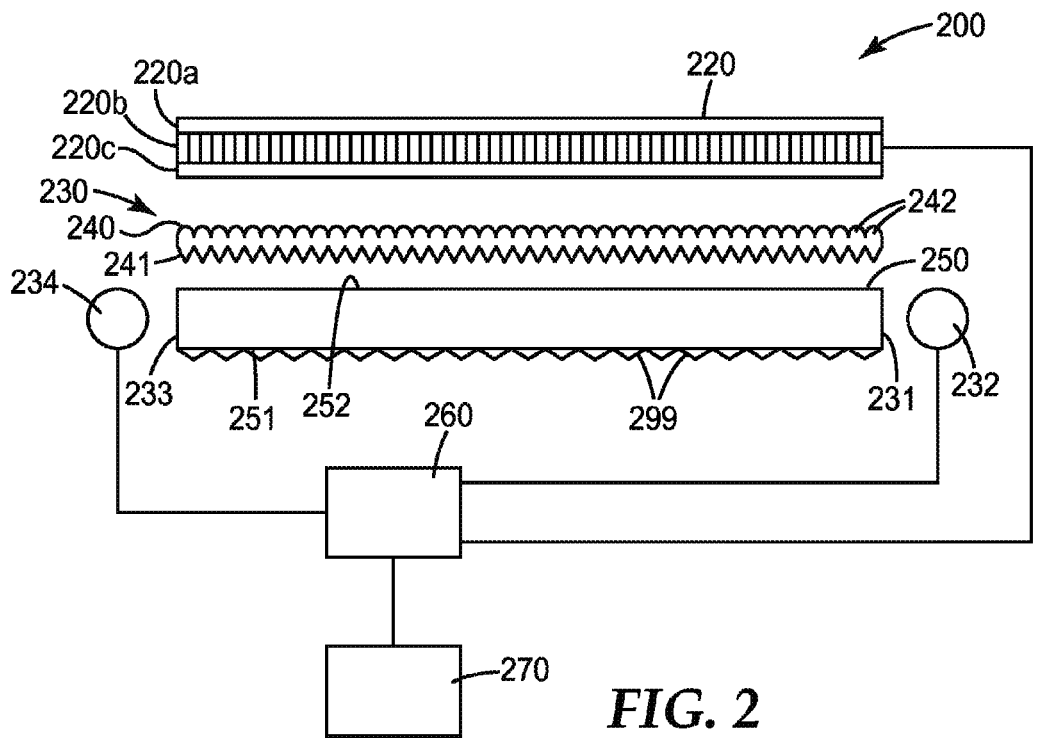
FIG. 2 is a schematic side view of an illustrative autostereoscopic display apparatus.

Another autostereoscopic display 200 is shown in FIG. 2. The display 200 includes a display panel 220, e.g., a liquid crystal display (LCD) panel, and a backlight 230 positioned to provide light to the liquid crystal display panel 220. The display panel 220 is shown as including an interior pixelated layer 220b of liquid crystal material sandwiched between two panels or plates 220a, 220c. The backlight 230 includes one or more light guides 250, one or more right eye image light sources 232, e.g., solid state light sources, and one or more left eye image light sources 234, e.g., solid state light sources. Each of the first and second light sources 232, 234 is capable of repetitively transitioning between an OFF state, during which the light source 232, 234 produces no light output or a very small light output, and an ON state, during which the light source 232, 234 produces a significant light output, at a rate that is imperceptible to the human eye, for example, at a rate of least 30 Hz per eye or preferably at least 60 Hz per eye.

The light sources 232, 234 may be inorganic solid state light sources, e.g., light emitting diodes (LEDs) or laser diodes, and/or may be organic light emitting diodes (OLEDs). Light extraction features 299, e.g., prisms, lenticular features, white dots, haze coatings and/or other features, may be disposed on one or both surfaces 251, 252 of the light guide 250. A double-sided light redirecting optical film 240, as described in more detail herein, is disposed between the liquid crystal display panel 220 and the light guide 250. The double-sided optical film 240 includes lenses 242 (linear lenticular structures or features) on the surface of the optical film 240 that is oriented away from the light guide 250. Each of the lenses 242 is registered to a corresponding prism 241 (linear prismatic structure or feature) on the surface of the optical film 240 that is oriented toward the light guide 250. In general, dimensions for the pitch of the lenses and prisms may be determined, for example, by selecting a pitch that would result in the elimination or reduction of Moiré patterns in the display 200. The lens and prism pitches can also be determined based upon manufacturability. As LCD panels are manufactured with different pixel pitches, it can be desirable to change the pitch of the optical film to accommodate the different pixel pitches of the LCD panel. A useful pitch range for an autostereoscopic light redirecting optical film 240 is about 10 microns to about 140 microns, for example.

The display 200 can have any useful shape or configuration. In many embodiments, the liquid crystal display panel 220 and/or light guide 250 have a rectangular or square shape. However, in some embodiments, the liquid crystal display panel 220 and/or the light guide 250 may have more than four sides and/or have a curved shape. The surfaces 251, 252 of the light guide 250 may be substantially parallel, or the light guide 250 may be wedge-shaped. In some cases, two wedge-shaped light guides with corresponding light sources may be used.

A synchronization driving element 260 is electrically connected to the right eye image and left eye image light sources 232, 234, and the liquid crystal display panel 220. The synchronization driving element 260 synchronizes activation and deactivation of the right eye image light source 232 and the left eye image light source 234 as image frames are provided to the liquid crystal display panel 220 to produce an image. The image may be a still image sequence, video stream, and/or rendered computer graphics, for example. An image source 270 is connected to the synchronization driving element 260 and provides the image frames (e.g., right eye images and left eye images) to the liquid crystal display panel 220.

The liquid crystal display panel 220 can be any useful transmissive liquid crystal display panel. In many embodiments, liquid crystal display panel 220 has a frame response time of less than 16 milliseconds, or less than 10 milliseconds, or less than 5 milliseconds, or less than 3 milliseconds. Commercially available transmissive liquid crystal display panels having an appropriate frame response time include, for example, the Toshiba Matsushita Display (TMD) optically compensated bend (OCB) mode panel LTA090A220F (Toshiba Matsushita Display Technology Co., Ltd., Japan).

The light guide 250 includes a first light input side 231 adjacent the right eye image light source 232 and an opposing second light input side 233 adjacent the left eye image light source 234. A first light guide surface 251 extends between the first side 231 and second side 233. A second light guide surface 252, opposite the first surface 251, extends between the first side 231 and the second side 233. Light may be reflected or emitted from either surface 251, 252 of the light guide 250, but in general light is emitted from surface 252 and is reflected from surface 251. In many embodiments, a highly reflective surface is on or adjacent the first surface 251 to assist in re-directing light out through the second surface 252.

In some embodiments, the first light guide surface 251 includes a plurality of extraction elements 299 such as prisms, lenticular features, white dots, haze coatings, and/or other features. The longitudinal axis of the extraction features can extend in a direction substantially parallel to the first side 231 and second side 233 or substantially parallel to the prisms and lenses of the double sided optical film 240, or the extraction features can be arranged at other angles.

The light sources 232, 234 can be any useful light source wherein the light output of each light source 232, 234 can be modulated from ON (relatively high light output) to OFF (no or negligible light output) at a rate of at least 30 Hz per eye or preferably 60 Hz or more per eye, for example. In many embodiments, the light sources 232, 234 are a plurality of LEDs, such as Nichia NSSW020B (Nichia Chemical Industries, Ltd., Japan). In some embodiments, the light sources 232, 234 comprise a plurality of laser diodes or OLEDs. The light sources 232, 234 can emit any number of visible light wavelengths such as red, blue, and/or green, or range or combinations of wavelengths to produce, for example, white light.

The light guide 250 can be a single layer of optically clear material with light sources adjacent both sides of the light guide 250, or two (or more) layers of optically clear material which preferentially extract light in a desired direction, with a light source for each layer.

The image source 270 can be any useful image source capable of providing image frames (e.g., right eye images and left eye images) such as, for example, a video source or a computer rendered graphic source. In many embodiments, the video source can provide image frames from 50 to 60 Hz or from 100 to 120 Hz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The image source 270 can provide video content. The image source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 260 can include any useful driving element providing synchronizing activation and deactivation (i.e., light output modulation) of the right eye image light source 232 and the left eye image light source 234 with image frames provided at a rate of, for example, 30 Hz or preferably 60 Hz or greater to the liquid crystal display panel 220 to produce video or rendered computer graphics. The synchronization driving element 260 can include a video interface such as, for example, a Westar VP-7 video adaptor (Westar Display Technologies, Inc., St. Charles, Mo.) coupled to custom light source drive electronics.

Figure 3:
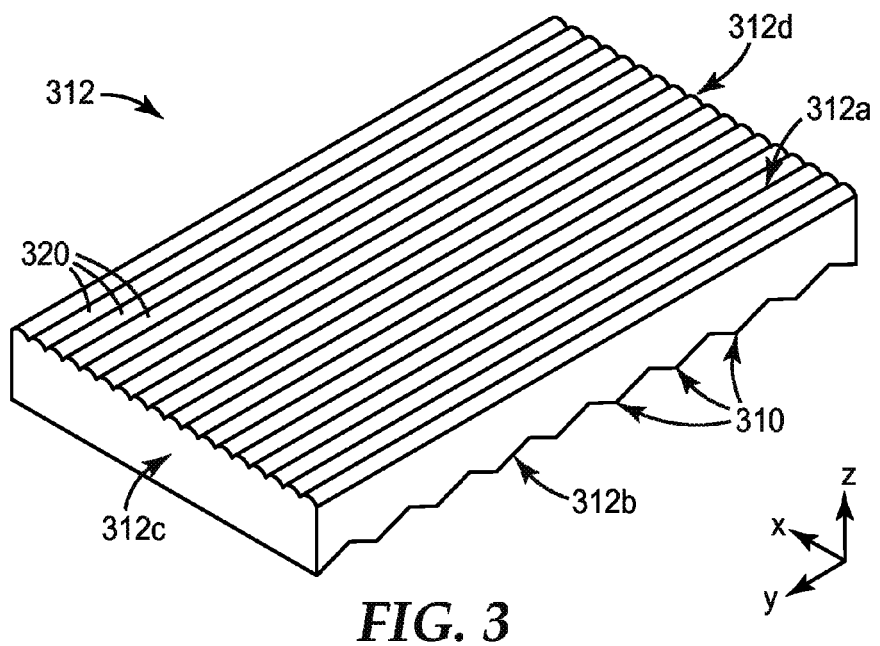
FIG. 3 is a schematic perspective view of a light guide, which view shows in exaggerated fashion exemplary surface structure on the two major surfaces of the light guide.
Figure 3A:
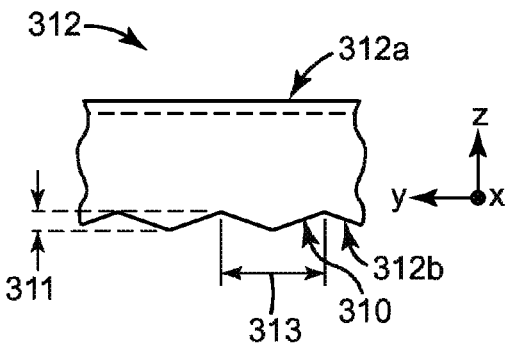
FIGS. 3a and 3b show schematic side views of the light guide of FIG. 3.
Figure 3B:
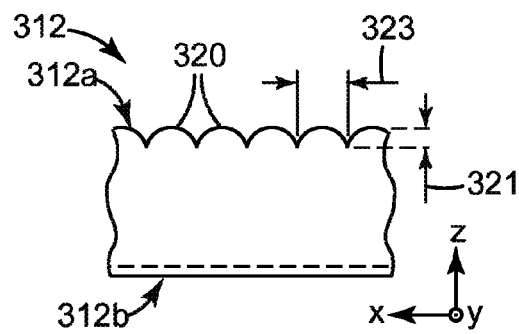

FIG. 3 shows a schematic perspective view of an exemplary light guide 312 that may be suitable for use in some of the disclosed backlights. The figure shows in exaggerated fashion exemplary surface structure on the two major surfaces of the light guide 312, but other orientations of the structured surface(s) relative to the edges or boundaries of the light guide can be beneficial. Schematic side views of the light guide are shown in FIGS. 3a and 3b. The light guide 312 includes a first major surface 312a from which light is extracted towards a display panel and/or observer, a second major surface 312b opposite the first major surface, and side surfaces 312c, 312d which may serve as light injection surfaces for left-beam-emitting and right-beam-emitting partially collimated light sources as discussed elsewhere herein. For example, one light source assembly may be positioned along the side surface 312c to provide a left eye beam emitted from the light guide 312, and a similar assembly can be positioned along the side surface 312d to provide a right eye beam emitted from the light guide 312.

The rear major surface 312b of the light guide is preferably machined, molded, or otherwise formed to provide a linear array of prism structures 310 shown best in FIG. 3a. These prism structures are designed to reflect an appropriate portion of the light propagating along the length of the light guide so that the reflected light can refract out of the front major surface 312a into air and onward to the display panel and/or observer, with one or more intervening light management films such as prismatic light redirecting film, and so that such reflected light is extracted from the front major surface relatively uniformly along the length of the light guide. The surface 312b may be coated with a reflective film such as aluminum, or it may have no such reflective coating. In the absence of any such reflective coating, a separate back reflector may be provided proximate the surface 312b to reflect any downward-propagating light that passes through the light guide so that such light is reflected back into and through the light guide. Preferably, the prism structures have a depth 311 that is shallow relative to the overall thickness of the light guide, and a width 313 that is small relative to the length of the light guide. The light guide may be made of any transparent optical material, preferably with low scattering such as an acrylic polymer, e.g., Spartech Polycast material. In one exemplary embodiment, the light guide may be made of acrylic material, such as cell-cast acrylic, and may have an overall thickness of 1.4 mm and a length of 140 mm along the y-axis, and the prisms may have a depth 311 of 2.9 micrometers and a width 313 of 81.6 micrometers, corresponding to a prism apex angle of about 172 degrees. The reader will understand that these values are merely exemplary, and should not be construed as limiting.

The front major surface 312a of the light guide is preferably machined, molded, or otherwise formed to provide a linear array of lenticular structures or features 320 that are parallel to each other and to an in-plane lenticular axis, such as the y-axis. On the other hand, the prism structures 310 may be parallel to each other and to an in-plane prismatic axis, such as the x-axis, along which the prism structures 310 extend. The lenticular structures may be shaped and oriented to enhance angular spreading along the x-axis for light that passes out of the light guide through the front major surface, and, if desired, to limit spatial spreading along the x-axis for light that remains in the light guide by reflection from the front major surface. In some cases, the lenticular structures 320 may have a depth 321 that is shallow relative to the overall thickness of the light guide, and a width 323 that is small relative to the width of the light guide. In some cases, the lenticular structures may be relatively strongly curved, as shown in FIG. 3b, while in other cases they may be more weakly curved. In one embodiment, the light guide may be made of cell-cast acrylic and may have an overall thickness of 0.76 mm, a length of 141 mm along the y-axis, and a width of 66 mm along the x-axis, and the lenticular structures 320 may have a radius of 35.6 micrometers, a depth 321 of 32.8 micrometers, and a width 323 of 72.6 mm, for example. In this embodiment, the prism structures 310 may have a depth 311 of 2.9 micrometers, a width 313 of 81.6 micrometers, and a prism apex angle of about 172 degrees. Again, the reader will understand that these embodiments are merely exemplary, and should not be construed as limiting; for example, structures other than lenticular structures may be used on the front major surface of the light guide.

Figure 4A:
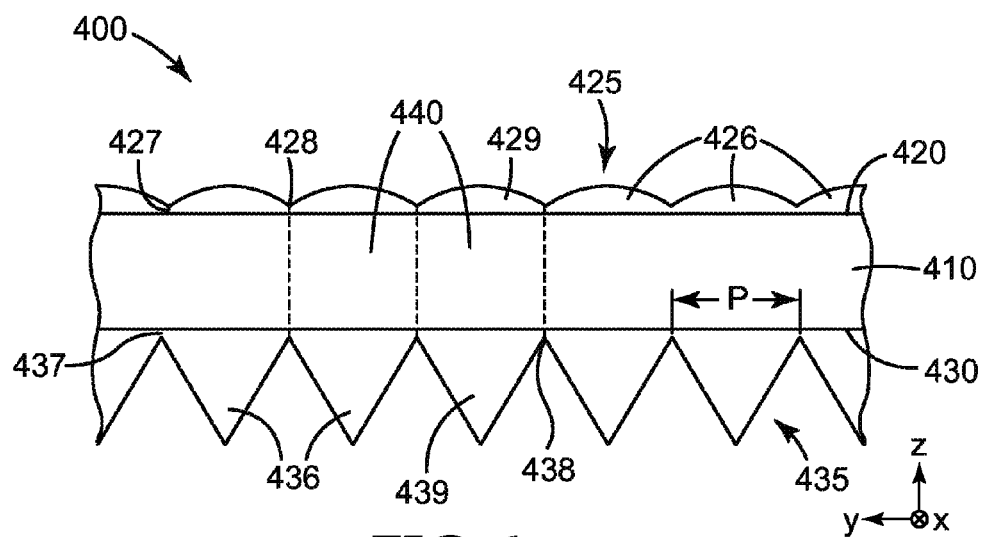
FIG. 4a is a schematic cross-sectional view of a 3D light redirecting film.

In FIG. 4a, an exemplary 3D light redirecting film 400 for use in autostereoscopic display systems is shown. The film 400 includes a web 410 substrate having opposed first and second surfaces 420, 430. Applied to these first and second surfaces 420, 430 are first and second microreplicated structures 425, 435, respectively. The first microreplicated structure 425 includes a plurality of arcuate or lenticular features 426, which may be cylindrical lenses with an effective diameter of about 142 microns, although other diameters may also be used. The second microreplicated structure 435 includes a plurality of saw-tooth or pyramidal prismatic features 436.

In the depicted example, the first and second features 426, 436 have the same pitch or period of repetition P, e.g., the period of the first feature may be about 150 microns, and the period of repetition of the second feature may be the same. Typically, the ratio of the period of the first and second features is a whole number ratio (or the inverse), though other combinations are permissible. The features shown are of indefinite length along the in-plane x-axis.

In the depicted example, opposed microreplicated features 426, 436 are paired or matched to form a plurality of optical elements 440. The performance of each optical element 440 is a function of the alignment of the respective opposed features 429, 439; hence, precision alignment or registration of the lenticular and prismatic features may be preferred. Note that although a given prismatic feature may be aligned or matched with a given one of the lenticular features to form an optical element, this should not be construed to imply that all light that enters such a prismatic feature from below is somehow confined to that optical element such that it only impinges on the particular lenticular feature that is paired with the prismatic feature. On the contrary, some light rays that enter such a prismatic feature from below may propagate by refraction and reflection through the film to lenticular features and prismatic features belonging to other optical elements.

The film 400 may in some cases include first and second land portions 427, 437. The land portions may be regarded as the layers of material between the substrate surfaces 420, 430 and the bottom of each respective feature, i.e., valleys 428, 438. The first land portion 427 may be at least about 2 microns thick on the lens side and the second land area 437 may be at least about 2 microns thick on the prism side. The land portions can help the features to have good adherence to the web and may also aid in replication fidelity. The sum of the thicknesses of both land portions can be selected to be in a range from, for example, 0 to 50 microns, and preferably in a range from 5 to 15 microns; the thickness of each land portion individually can be tailored as necessary to balance optical, manufacturing, and environmental stability considerations.

The film 400 may be made using an apparatus and method for producing precisely aligned microreplicated structures on opposed surfaces of the web, the apparatus and methods of which are described in detail in U.S. Pat. No. 7,224,529 (King et al.). In some cases, the film 400 may be made using a web made from polyethylene terephthalate (PET) of suitable thickness, e.g., 124 microns (0.0049 inches) thick, for example. Other web materials may also be used, e.g., polycarbonate or other suitable light-transmissive polymers.

Figure 4B:
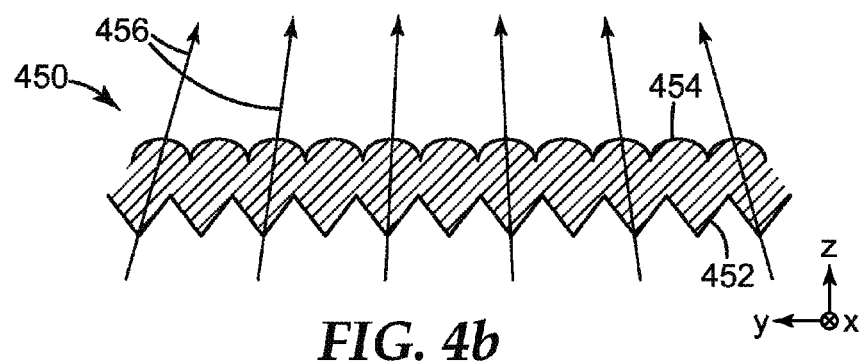
FIG. 4b is a schematic cross-sectional view of another 3D light redirecting film.

In FIG. 4b, another 3D light redirecting film 450 suitable for use in autostereoscopic display systems is shown. A group of cylindrical lenses 454 (lenticular features) is formed on one side of the film 450, and a group of triangular-like prisms 452 (prismatic features) is formed on the other side. In this embodiment, the center-to-center spacing or pitch of the prisms 452 is deliberately made to be greater than the pitch of the cylindrical lenses, such that center lines 456 drawn from the apex of each prism to a core of each corresponding cylindrical lens gather or intersect at a specified region of space above the film 450. For example, the specified region may be a region 20 to 100 cm above or of front of the center section of the film 450 or associated display. Further details of light redirecting films as depicted in FIG. 4a can be found in Japanese Publication JP 2005-266293 (Akimasa et al.)

Still other 3D light redirecting film designs are described in commonly assigned U.S. patent application Ser. No. 12/643, 503, "Optical Films Enabling Autostereoscopy", filed Dec. 21, 2009 and incorporated herein by reference in its entirety. This application discloses, among other things, double-sided optical films that include so-called "a-cylindrical" lenses disposed on a first surface of the optical film, and prisms disposed on a second surface of the optical film, wherein each lens on the first surface is registered to a prism on the second surface. The application also discloses double-sided optical films that include lenses disposed on a first surface of the optical film, and prisms disposed on a second surface of the optical film, wherein a rotation of the lenses on the first surface varies with position on the first surface and each lens on the first surface is registered to a prism on the second surface.

Figure 5:
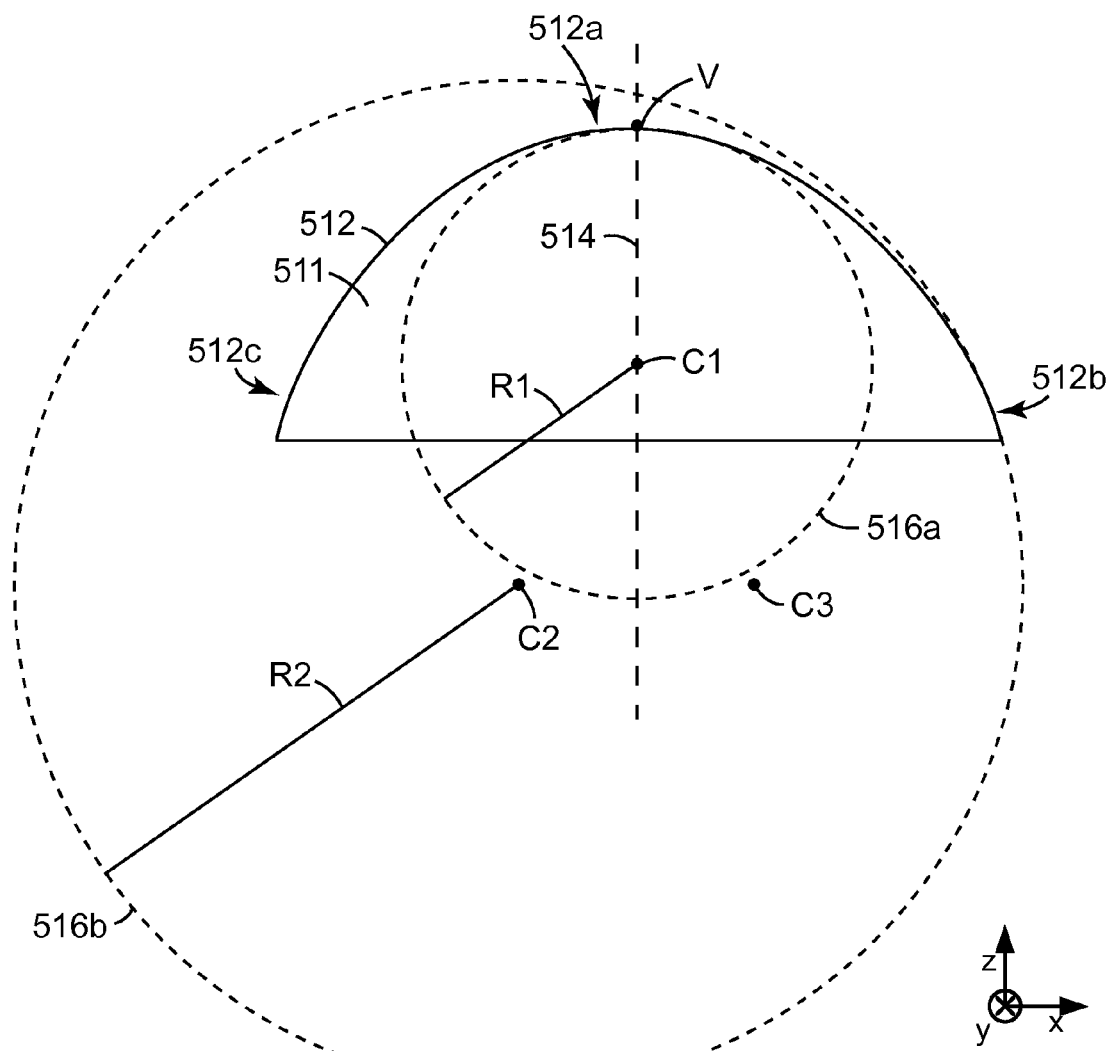
FIG. 5 is a schematic side or sectional view of a lenticular feature of an exemplary light redirecting film, the lenticular feature having compound curvature and a symmetry axis.

In FIG. 5, we see a schematic side or sectional view of a lenticular feature 511 of an exemplary light redirecting film. The feature 511 is assumed to extend linearly into and out of the plane of the figure, i.e., along the y-axis, and is assumed to maintain an arcuate or curved surface 512 in cross-section in the x-z plane along the length of the feature. (The reader will note that the Cartesian x-y-z reference axes shown in FIGS. 5 through 13 are different from those used in FIGS. 1a through 4b, but that a simple transformation can be used to compare one reference system (or axis thereof) with the other.) The lenticular feature 511 is of the "a-cylindrical" type mentioned above, i.e., it has a compound curvature, which means that the curvature of the arcuate surface 512 is different at different locations on the surface. Compound curvature may be distinguished from simple curvature, wherein an arcuate surface has a constant curvature along its entire surface, as in the case of a right circular cylinder or section thereof. The compoundly-curved arcuate surface 512 has a vertex V at an upper or central portion of the structure. The shape of the surface 512 in a vicinity 512a of the vertex V has a radius of curvature R1, which corresponds to a circle 516a whose center is C1 as shown. But as one proceeds along the surface 512 to the peripheral portion 512b, the curvature of the surface changes, preferably in a continuous or gradual fashion, such that at the peripheral portion 512b the surface 512 has a radius of curvature R2, which corresponds to a circle 516b whose center is C2. In exemplary embodiments, the radius of curvature at the peripheral portions of the lenticular feature is greater than the radius of curvature at the vertex, such that R2>R1, in order to reduce certain aberrations. Also in exemplary embodiments, the lenticular feature and arcuate surface 512 exhibit a mirror symmetry, e.g. about a plane or line 514 that passes through the vertex V and through the point C1. The line 514 may thus be considered to be a symmetry axis and an optical axis of the lenticular feature 511 and of the arcuate surface 512. Note that a peripheral portion 512c of the surface 512 opposite the portion 512b may have the same curvature (R2) as the portion 512b, where the curvature of the portion 512c is centered at the point C3 as shown. In cases where the surface 512 has mirror symmetry about the line 514, the points C2 and C3 are also symmetrically disposed about the line 514.

Figure 6A:
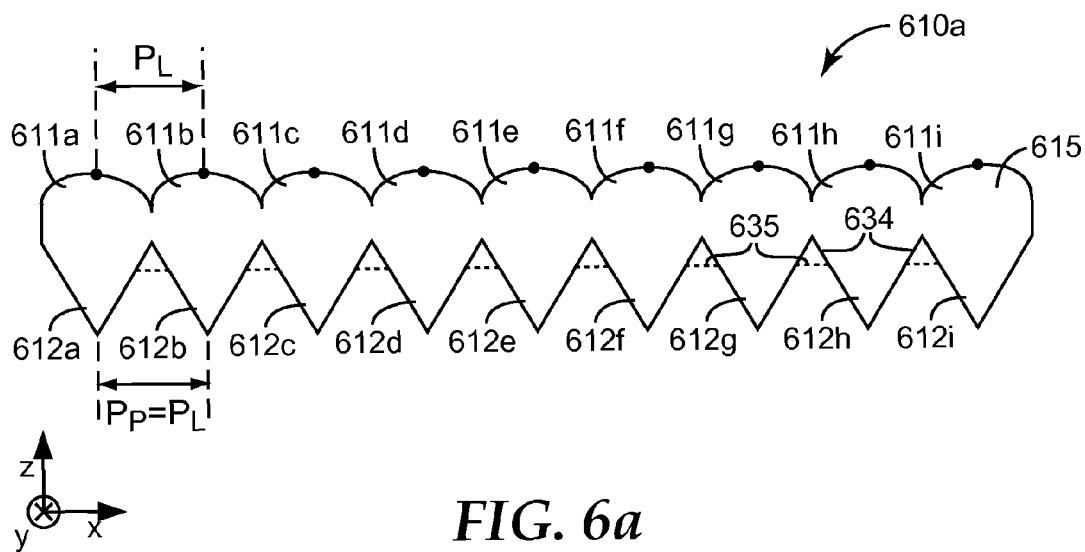
FIGS. 6a and 6b are a schematic side or sectional views of light redirecting films that incorporate lenticular features with compound curvature.
Figure 6B:
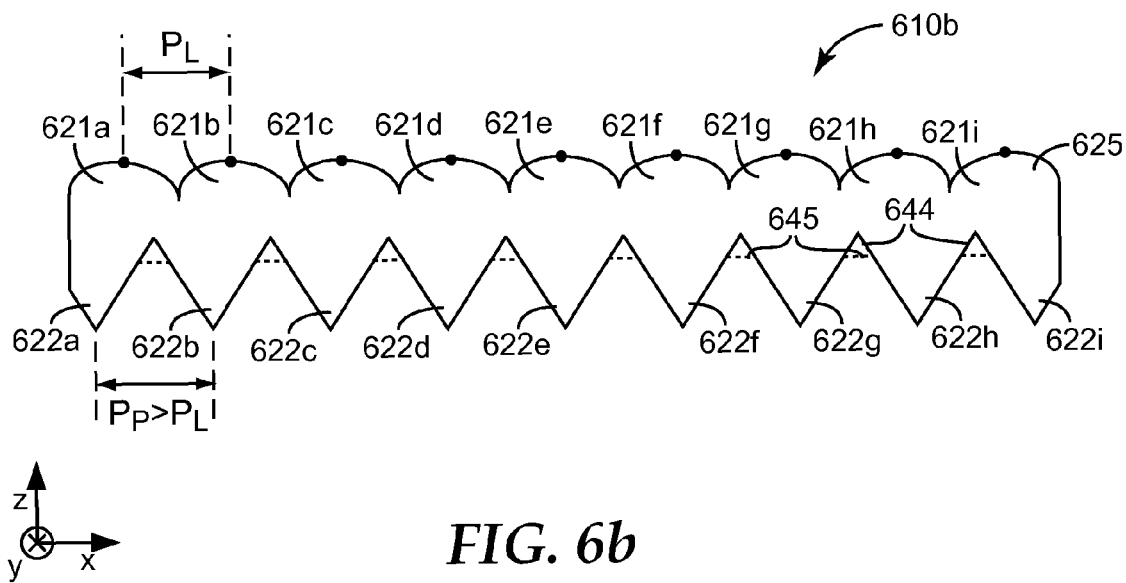

Compoundly-curved lenticular features such as that shown in FIG. 5 can be incorporated into 3D light redirecting films as shown schematically in FIGS. 6a and 6b. In those figures, lenticular features (lenses) of one structured surface of the film are shown to be matched or paired with prismatic features (prisms) of an opposed structured surface of the film in a one-to-one correspondence to provide the film with optical elements which each have one lenticular feature and one prismatic feature. Although a relatively small number of lenticular features, prismatic features, and optical elements are shown in FIGS. 6a and 6b, the reader will understand that an actual 3D optical film would typically have many more optical elements than are depicted in these figures.

FIG. 6a illustrates schematically a 3D light redirecting film 615 having optical elements corresponding to lens/prism pairs 611a/612a, 611b/612b, 611c/612c, 611d/612d, 611e/612e, 611f/612f, 611g/612g, 611h/612h, and 611i/612i. The lenses 611a-611i have compound curvatures such as that shown in FIG. 5 or of any other suitable shape. Dark circles or dots have been drawn on each lens to represent the vertex of the lens (refer to vertex V in FIG. 5). Each lens 611a-611i on one structured surface of the film 615 is registered to a corresponding prism 612a-612i on the opposing structured surface of the film 615. The distance between the vertices of adjacent lenses is labeled $P_L$, and may be considered to be a pitch of the lenses. The distance between vertices of adjacent prisms is labeled $P_P$, and may be considered to be a pitch of the prisms. In the embodiment of FIG. 6a, the parameters $P_L$ and $P_P$ are constant over the working area of the film 615, and $P_L$ is substantially equal to $P_P$. Both the lenses 611a-611i and the prisms 612a-612i are contiguous. The cross section of the optical elements or lens/prism pairs for film 615 is substantially uniform, i.e., does not substantially vary from pair to pair along the x-axis.

FIG. 6b illustrates schematically a 3D light redirecting film 625 having optical elements corresponding to lens/prism pairs 621a/622a, 621b/622b, 621c/622c, 621d/622d, 621e/622e, 621f/622f, 621g/622g, 621h/622h, and 621i/622i. The lenses 621a-621i have compound curvatures such as that shown in FIG. 5 or of any other suitable shape. Dark circles or dots have again been drawn on each lens to represent the vertex of the lens. Each lens 621a-621i on one structured surface of the film 625 is again registered to a corresponding prism 622a-622i on the opposing structured surface of the film 625, but the alignment of the corresponding lenses and prisms changes across the working area of the film. The distance between the vertices of adjacent lenses is labeled $P_L$, and may be considered to be a pitch of the lenses. The distance between vertices of adjacent prisms is labeled $P_P$, and may be considered to be a pitch of the prisms. In the embodiment of FIG. 6b, the parameters $P_L$ and $P_P$ are constant over the working area of the film 615, but $P_L$ is less than $P_P$. This causes the prisms to be offset by different amounts from their corresponding lenses. In the center of the film, the vertex of lens 621e is substantially aligned with the vertex of the corresponding prism 622e. Due to the difference between $P_L$ and $P_P$, the lens/prism pairs 621d/622d, 621f/622f that immediately neighbor lens/prism pair 621e/622e have lenses and prisms that are offset by half the difference between $P_P$ and $P_L$. The offset between the lenses and prisms in the lens/prism pairs 621c/622c, 621g/622g, 621b/622b, 621h/622h, 621a/622a, 621i/622i increases in both directions along the x axis as a function of distance from the starting point, which in this example is the aligned lens/prism pair 621e/622e.

Although FIG. 6b (and FIGS. 11 and 12 below) show only one lens/prism pair that is in precise alignment with respect to the z-axis, the reader will understand that optical films may be constructed that include any number of aligned lens/prism pairs, or no aligned lens/prism pairs. In the case of multiple aligned lens/prism pairs, the films may have a prism pitch that is different from the lens pitch, thus causing an offset between the lenses and prisms that increases with distance from each aligned lens/prism pair. In some cases, the aligned lens/prism pair(s) may be arranged at the center of the 3D film (corresponding also to the center of the autostereoscopic backlight and display) so that the increasing offset between the lenses and the prisms that occurs on opposite sides of the aligned lens/prism pair serves to aim the light output from the optical film toward a central axis or viewing axis of the display.

Some 3D light redirecting films described herein, including those shown in solid lines in FIGS. 6a and 6b, have contiguous lenticular and prismatic features on both sides of the optical film. Contiguous features on both sides of the film can, however, have some disadvantages. The thickness of a thin land, either between the lenses and a substrate, and/or between the prisms and the substrate, is determined by the optics of the film, but sharp corners and a land thickness that is too small can sometimes lead to delamination. In addition, differences in the volume and structure of the features on the light redirecting film can exacerbate film warping. From an optical perspective, a light redirecting film with contiguous features may also have a broader horizontal viewing range than may be desirable. For these reasons, it may be desirable to provide interruptions between prisms and/or lenses to provide prisms and/or lenses that are non-contiguous. Because the autostereoscopic optical effects of the light redirecting films depend in part on the peaks of the prisms, the 3D light redirecting films may incorporate interruptions between the bases of the prisms so that the prisms are non-contiguous. This is shown in FIG. 6a, where flattened portions 635 may replace v-shaped portions 634, and in FIG. 6b, where flattened portions 645 may replace v-shaped portions 644. The shape of the prisms near the interruptions can be tailored to reduce the sharpness of the transition at the interruptions between the prisms and the substrate. For example, a curved rather than a sharp transition may be used to improve the mechanical stability of the film, to prevent cracking and delamination, and/or to reduce film warping.

In the present application we describe 3D light redirecting films in which one or more lenticular features, one or more prismatic features, or both, may be tilted relative to the thickness axis of the film. The flexibility of being able to tilt or rotate one or both of these types of features allows for the design and manufacture of 3D films with unique performance characteristics. For example, 3D films with a wider range of toe-in angles can be made. A toe-in angle in the regard refers to an angle of oblique light propagation for light transmitted by the film, see e.g. the converging light rays in FIG. 4b. Increased toe-in angles allow for shorter viewing distance and/or for larger display (and film) sizes. The new 3D films can also provide sharper stereoedges at high toe-in angles. A stereoedge in this regard refers to the rapid transition from the left eye light beam to the right eye light beam, or vice versa, as a function of viewing angle.

Figure 7:
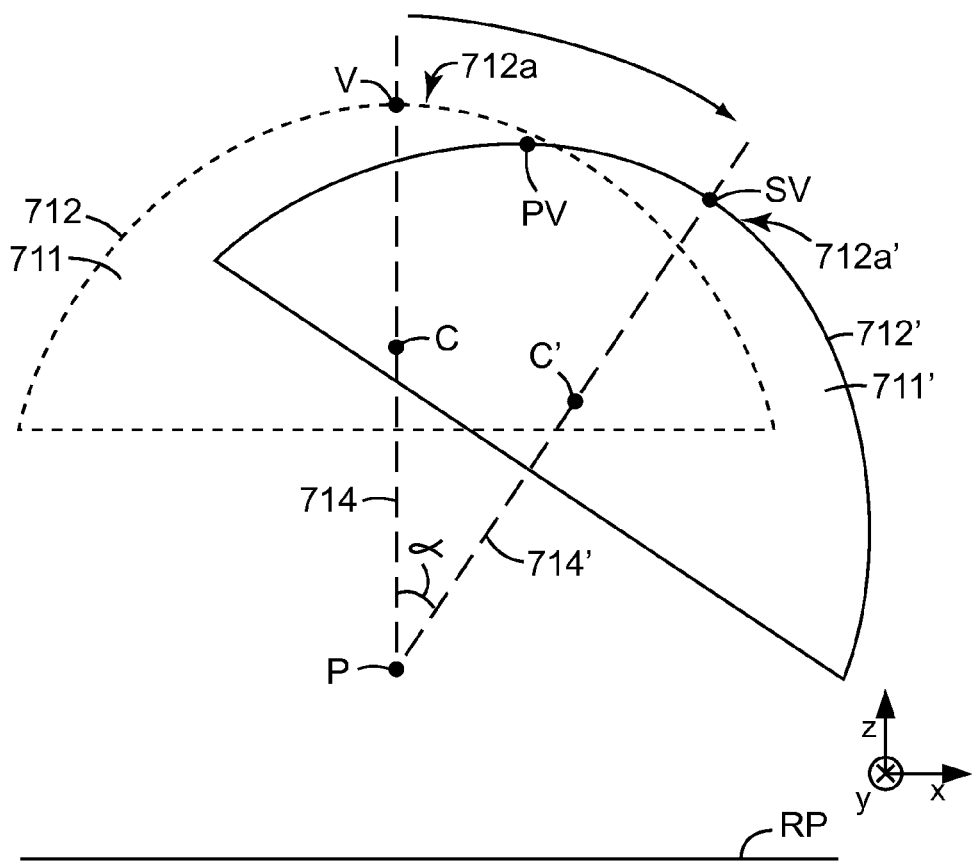
FIG. 7 is a schematic side or sectional view showing how a lenticular feature of an exemplary light redirecting film can be rotated or tilted.

In FIG. 7, therefore, we show how a lenticular feature 711 of an exemplary light redirecting film can be tilted or rotated to produce a tilted lenticular feature 711'. The light redirecting film, of which the lenticular feature 711 (or the lenticular feature 711') is a part, is assumed to extend in a film plane parallel to the x-y plane. The thickness axis of the light redirecting film is therefore assumed to be parallel to the z-axis. The lenticular feature 711 is assumed to extend linearly into and out of the plane of the figure, i.e., along the y-axis, and is assumed to maintain an arcuate or curved surface 712 in cross-section in the x-z plane along the length of the feature 711. The lenticular feature 711 has a compound curvature, as discussed above. The compoundly-curved arcuate surface 712 has a vertex V at an upper or central portion 712a of the structure. The shape of surface 712 may have a radius of curvature R1 (centered at point C) in a vicinity of the vertex V, and a different radius of curvature R2 at the peripheral portions of the surface. Preferably, R2>R1. The arcuate surface 712 also preferably exhibits a mirror symmetry about a plane or line 714 that passes through the vertex V and through the point C. The line 714 may thus be considered to be a symmetry axis and an optical axis of the lenticular feature 711 and of the arcuate surface 712. The optical axis 714 is parallel to the z-axis of the reference coordinate system.

A tilted counterpart of the feature 711 may be defined by a simple rotation of the feature 711 about a point P that lies on the optical axis 714. (The rotation may be described more precisely as occurring about an axis of rotation that passes through the point P and that is parallel to the y-axis.) By rotating the feature by an angle α about this point, we produce a tilted or rotated lenticular feature 711'. The lenticular feature 711' has an arcuate surface 712' that is substantially identical to surface 712, except for the rotation. Arcuate surface 712' is therefore compoundly curved in the same way as surface 712, and has a tilted symmetry axis or optical axis 714' that passes through the pivot point P.

The rotation or tilt of the lenticular feature leads us to distinguish between two different types of vertices for the tilted lenticular feature 711'. The tilted surface 712' has a vertex SV defined by the intersection of the surface 712' with the tilted symmetry axis 714'. This vertex SV may be considered to be a symmetry vertex of the arcuate surface 712', the symmetry vertex corresponding to a rotation of the original vertex V of the surface 712 about the point P by the angle α. The tilted surface 712' also has another vertex of interest, which is labeled PV in FIG. 7. The vertex PV may be considered to be a peak vertex of the arcuate surface 712', i.e., a point on the surface 712' that is "highest" from the standpoint of FIG. 7, or, more generally, that is disposed at the greatest perpendicular distance from a reference plane RP. The reference plane RP is parallel to the x-y plane, and thus parallel to the plane of the light redirecting film of which the lenticular feature 711' is a part. The physical significance of the vertex PV is that when the light redirecting film is laid flat, with the lenticular structured surface facing up and the prismatic structured surface facing down, the vertex PV is the highest or outermost point of the lenticular feature 711'. Since PV is the outermost point on the arcuate surface of a given lenticular feature, it is the peak vertex PV and not the symmetry vertex SV that determines the overall thickness or caliper of a 3D light redirecting film in the vicinity of the tilted lenticular feature. (In the case of a non-tilted lenticular feature, the PV vertex and the SV vertex degenerate into a single vertex V.) Note that for the particular geometries used in FIG. 7, the rotation of the lenticular feature about the point P results in a diminished height of the lenticular feature above the reference plane RP, since the distance from PV to the reference plane is less than the distance from V to the reference plane. More discussion of film caliper and its relationship to the tilt of the lenticular features is provided below.

Figure 8:
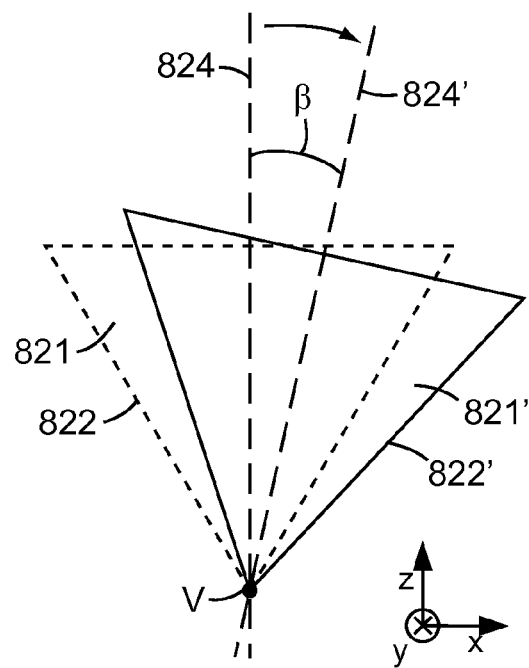
FIG. 8 is a schematic side or sectional view showing how a prismatic feature of an exemplary light redirecting film can be rotated or tilted.

The present application describes 3D light redirecting films in which not only lenticular feature(s), but also prismatic feature(s), may be tilted relative to the thickness axis of the film. In FIG. 8, therefore, we show how a prismatic feature 821 of an exemplary light redirecting film can be tilted or rotated to produce a tilted prismatic feature 821'. The light redirecting film, of which the prismatic feature 821 (or the prismatic feature 821') is a part, is assumed to extend in a film plane parallel to the x-y plane. The thickness axis of the light redirecting film is therefore assumed to be parallel to the z-axis. The prismatic feature 821 is assumed to extend linearly into and out of the plane of the figure, i.e., along the y-axis, and is assumed to maintain the same V-shaped prism surface 822 in cross-section along the length of the feature 821. The V-shaped surface 822 is characterized by an acute included angle (not labeled) at the vertex V of the prism. The surface 822 exhibits a mirror symmetry about a plane or line 824 that bisects the included prism angle and passes through the vertex V. The line 824 may thus be considered to be a symmetry axis and an optical axis of the prismatic feature 821 and of the prism surface 822.

A tilted counterpart of the feature 821 may be defined by a simple rotation of the feature 821 about a given point, which we select for convenience as the prism vertex V. (The rotation may be described more precisely as occurring about an axis of rotation that passes through the prism vertex and is parallel to the y-axis.) By rotating the feature by an angle β, we produce a tilted or rotated prismatic feature 821'. The prismatic feature 821' has a V-shaped prism surface 822' that is substantially identical to surface 822, except for the rotation. The V-shaped surface 822' therefore has the same included angle as surface 822, and has a symmetry axis or optical axis 824' that passes through the prism vertex V. Since the prism vertex V was used as a pivot point, it is shared between the non-tilted prismatic feature 821 and the tilted prismatic feature 821'.

Figure 9A:
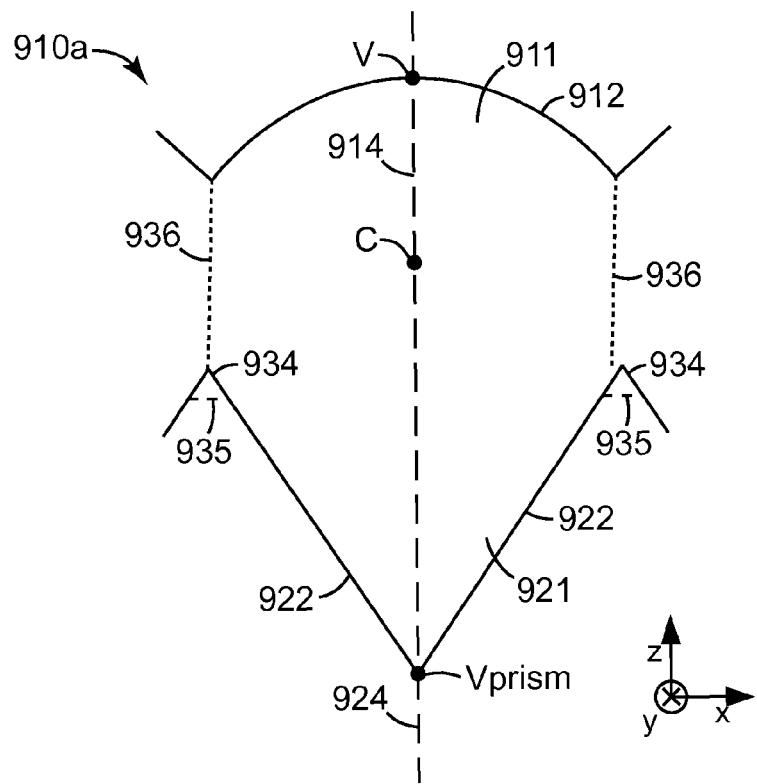
FIG. 9a is a schematic side or sectional view of a portion of a light redirecting film showing one lenticular feature/prismatic feature pair, and neither the lenticular feature nor the prismatic feature is tilted.

FIG. 9a is a schematic side or sectional view of a portion of a light redirecting film showing one optical element 910a of the film, the optical element having a matched pair of one lenticular feature 911 and one prismatic feature 921. We may consider the optical element 910a as having boundaries 936 that distinguish it from its neighboring optical elements, while also realizing that light from other portions of the film is free to cross such boundaries and is free to propagate e.g. by reflection or refraction from one optical element to another. In the embodiment of optical element 910a, neither the lenticular feature nor the prismatic feature is tilted with respect to a thickness axis (the z-axis) of the film. The lenticular feature 911 has an arcuate surface 912 whose curvature in the vicinity of the vertex V corresponds to a circle whose center is C. Preferably, the surface 912 has a compound curvature as described above. The feature 911 thus has a symmetry axis and optical axis 914 that passes through the lenticular vertex V and through the axial center of curvature C. In addition to the lenticular feature, the optical element also has a prismatic feature 921 that is at least nominally in registration with, and thus paired with, the lenticular feature 911. The prismatic feature 921 has a V-shaped prism surface 922 characterized by an included angle at a prism vertex Vprism, and a symmetry axis or optical axis 924 that passes through the prism vertex and bisects the included prism angle. In this embodiment, the prism optical axis 924 is coincident with the lenticular optical axis 914, and these axes are parallel to and optionally also coincident with the z-axis or thickness axis of the film.

The prisms and lenses of the 3D film of FIG. 9a may be contiguous or non-contiguous as desired. For example, adjacent prisms may be contiguous and characterized by v-shaped portions 934 between prisms, or they may be non-contiguous and characterized by flattened portions 935 between prisms. The shape of the prisms in the border regions can be tailored to reduce the sharpness of the transition between prisms.

The light redirecting film of which the optical element 910a is a part may have a layered construction, as shown in FIG. 4a above or FIG. 10 below, or the film may have a unitary construction and be made of a single material. Of course, the optical performance of the film will ultimately depend not only on the shape or geometry of the structured surfaces but also on the refractive index (indices) of the light transmissive material(s) used.

Figure 9B:
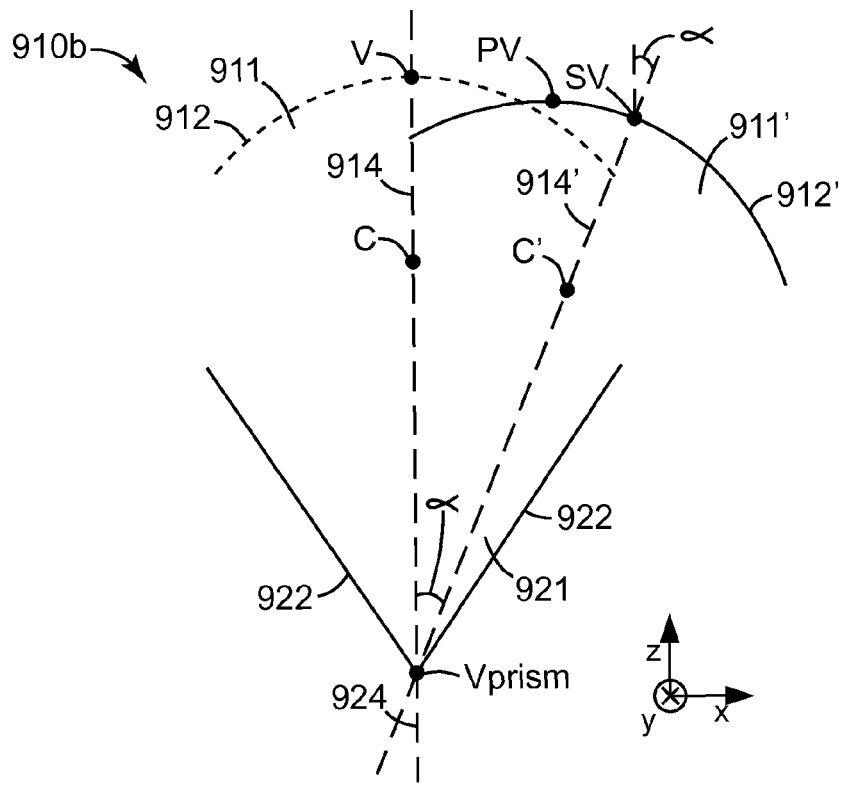
FIG. 9b is a schematic side or sectional view of the lenticular/prismatic feature pair of FIG. 9a, but where the lenticular feature has been rotated or tilted.

FIG. 9b depicts an optical element 910b that may be similar to optical element 910a, except that the lenticular feature 911 has been rotated about the vertex of the prism Vprism by an angle α. The original, non-rotated lenticular feature 911 is included in the drawing for reference, using a dashed line. The resulting tilted lenticular feature 911' has an arcuate surface 912' having a symmetry vertex SV and a peak vertex PV. The surface 912' has an axis of symmetry or optical axis 914' that intersects the z-axis and the prism optical axis 924 at the angle α. The optical axis 914' of the tilted lenticular feature also passes not only through the vertex SV and the axial center of curvature C', but also through the prism vertex Vprism. In alternative embodiments, the tilted lenticular feature may be moved or shifted along the x-direction and/or the z-direction such that the optical axis of the tilted lenticular feature does not pass through the prism vertex.

Figure 9C:
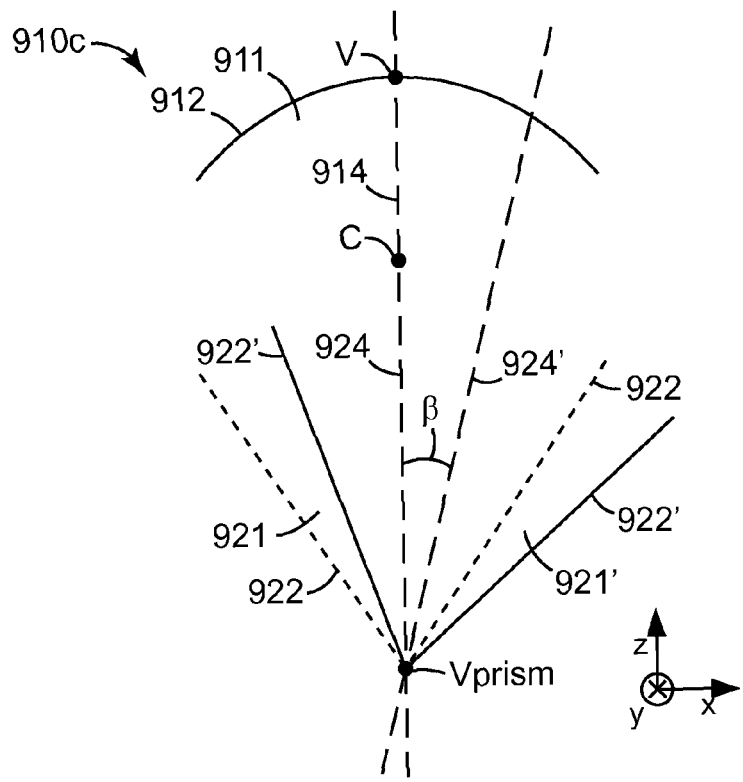
FIG. 9c is a schematic side or sectional view of the lenticular/prismatic feature pair of FIG. 9a, but where the prismatic feature has been rotated or tilted.

FIG. 9c depicts an optical element 910c that may be similar to optical element 910a, except that the prismatic feature 921 has been rotated about the vertex of the prism Vprism by an angle β. The original, non-rotated prismatic feature 921 is included in the drawing for reference, using dashed lines. The resulting tilted prismatic feature 921' has a V-shaped surface 922' that is substantially identical to surface 922 (FIG. 9a), except for the rotation. The surface 922' has an axis of symmetry or optical axis 924' that intersects the z-axis and the lenticular optical axis 914 at the angle β. The V-shaped prism surface 922' has the same included angle as the prism surface 922. The rotated prismatic feature 921' shares the same vertex Vprism as the non-rotated prism due to rotation about the point Vprism, but in alternative embodiments the tilted prismatic feature may be moved or shifted along the x-direction and/or the z-direction such that the vertex of the tilted prism is higher, lower, to the left, and/or to the right (from the standpoint of FIG. 9c) relative to the vertex of the original non-tilted prism.

Figure 9D:
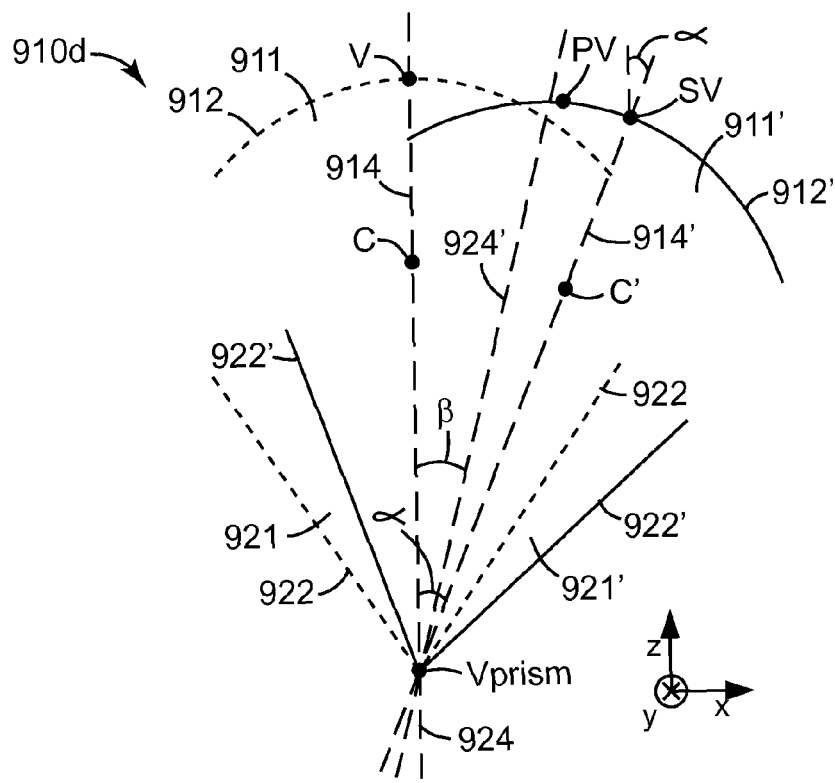
FIG. 9d is a schematic side or sectional view of the lenticular/prismatic feature pair of FIG. 9a, but where the both the lenticular feature and the prismatic feature have been rotated or tilted.

FIG. 9d depicts an optical element 910d that may be similar to optical element 910a, except that the lenticular feature 911 has been rotated about the vertex of the prism Vprism by an angle α, and the prismatic feature 921 has been rotated about the vertex of the prism Vprism by an angle β. The original, non-rotated lenticular feature 911, and the original, non-rotated prismatic feature 921, are included in the drawing for reference, using dashed lines. The resulting tilted lenticular feature 911' may have an arcuate surface 912', symmetry vertex SV, peak vertex PV, axial center of curvature C', and optical axis that are as described above in connection with FIG. 9b. The tilted prismatic feature 921' may have a V-shaped prism surface 922', vertex Vprism, and optical axis 924' that are as described above in connection with FIG. 9c. Thus, for example, in alternative embodiments the tilted prismatic feature may be moved or shifted along the x-direction and/or the z-direction such that the vertex of the tilted prism is higher, lower, to the left, and/or to the right (from the standpoint of FIG. 9d) relative to the vertex of the original non-tilted prism.

Design investigations we have carried out for optical elements having both tilted lenticular features and tilted prismatic features have revealed that it is advantageous to arrange the angles α and β such that $0<|\beta|<|\alpha|$. In some cases, it is further advantageous to select α and β such that $|\beta| \approx |\alpha|/2$. For example, $0.4|\alpha| \leq |\beta| \leq 0.6|\alpha|$. Further information in this regard is provided below.

Figure 10:
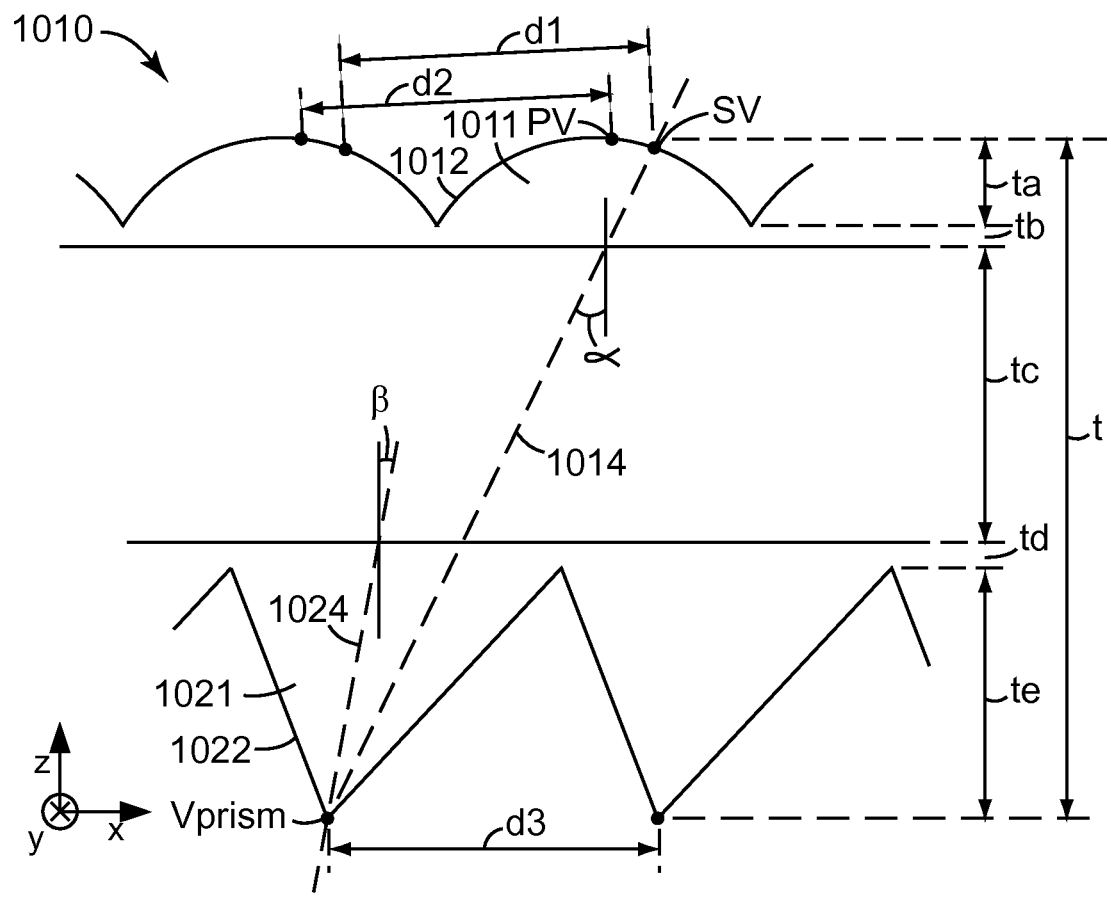
FIG. 10 is a schematic side or sectional view of a portion of a light redirecting film in which lenticular and prismatic features are tilted.

A portion of a 3D light redirecting film 1010 extending parallel to an x-y plane is shown in FIG. 10. In this figure, one lenticular feature 1011 is labeled and one prismatic feature 1021 is labeled, these features 1011, 1021 being in nominal registration with each other and thus being paired to form an optical element of the film. In this embodiment, both features 1011, 1021 are tilted with respect to the thickness axis of the film 1010, i.e., with respect to the z-axis in the figure, but they are tilted by different amounts that satisfy the relationship $0<|\beta|<|\alpha|$. The lenticular feature 1011 has a symmetry vertex SV, a peak vertex PV, and an axis of symmetry of optical axis 1014. The prismatic feature has a V-shaped prism surface 1022, a vertex Vprism, and an axis of symmetry or optical axis 1024. The optical axis 1014 of the lenticular feature is tilted by an angle α; the optical axis of the prismatic feature is tilted by an angle β; and the angle β is roughly one-half the angle α. The degree of tilt and placement of the lenticular feature 1011 relative to the prismatic feature 1021 has been selected such that the optical axis of the lenticular feature passes through or near the vertex of the prism, Vprism.

Each lenticular feature and each prismatic feature of the film 1010 is assumed to extend into and out of the plane of the figure, i.e., along the y-axis. In one embodiment, the lenticular features that form the upper structured surface of the film 1010 have amounts of tilt that change from one lenticular feature (or group of features) to the next across the face of the film, i.e., along the x-axis in FIG. 10. Similarly, the prismatic features that form the lower structured surface of the film 1010 may have amounts of tilt that change from one prismatic feature (or group of features) to the next across the face of the film, i.e., along the x-axis. For example, the portion of the 3D film 1010 shown in FIG. 10 may be disposed near a left edge (from the perspective of FIG. 10) of the film, and a central portion of the 3D film 1010 may be disposed far to the right of the figure. In that case, the amount of tilt α of the lenticular features may proceed monotonically from larger values to smaller values as one moves to the right, with the tilt angle α being very small or substantially zero at the center of the film, and the amount of tilt may thereafter monotonically proceed from smaller values to larger values (but of opposite polarity, e.g., a counterclockwise rotation rather than a clockwise rotation) as one continues to proceed to the right, from the center of the film to a right edge (from the perspective of FIG. 10) of the film. Similarly, the amount of tilt β of the prismatic features may also proceed monotonically from larger to smaller values as one moves to the right, with the tilt angle β being zero at the center of the film, and the amount of tilt may thereafter monotonically proceed from smaller values to larger values (but of opposite polarity, e.g., a counterclockwise rotation rather than a clockwise rotation) as one continues to proceed to the right, from the center to a right edge of the film. A one-to-one pairing of lenticular features to prismatic features may be maintained in such an embodiment, and each optical element may satisfy the relationships $0<|\beta|<|\alpha|$ and $|\beta| \approx |\alpha|/2$.

Thickness profiles, and sequences of tilt angles, other than monotonic functions from the central portion of the film to a given edge portion of the film are also contemplated. Such other functions may be or include discontinuous functions and retrograde functions, for example, and functions that are piecewise monotonic. A first group of neighboring optical elements may, for example, have the same tilt values (of α and/or β) and the same thickness, but those values and/or that thickness may differ from those of another group of optical elements adjacent the first group. In some cases, the functions that represent the thickness profile and/or sequences of tilt angles across the film may include irregularity, e.g., random variations, periodic variations, or a combination thereof, which may be beneficial for example in reducing visual artifacts such as defect hiding or anti-wetout.

FIG. 10 depicts the 3D film 1010 as being composed of an inner (e.g. flat) film on which a layer of lenticular features has been formed on one major surface of the inner film, and on which a layer of prismatic features has been formed on the opposite major surface of the inner film. The overall thickness or caliper of the portion of the 3D film 1010 is labeled "t". This thickness t is shown to be made up of the constituent thicknesses ta, tb, tc, td, and te, where ta is a height or thickness of the lenticular feature 1011, tb is a land thickness of the lenticular layer, tc is the thickness of the inner film, td is a land thickness for the prismatic layer, and te is a height or thickness of the prismatic feature 1021. Note that the overall thickness or caliper t is based on the position of the peak vertex PV of the tilted lenticular feature 1011, rather than the symmetry vertex SV. As mentioned elsewhere herein, the light redirecting film such as that of FIG. 10 may have a unitary construction and be made of a single light-transmissive material.

FIG. 10 also depicts various characteristic transverse dimensions of the film 1010. The distance d1, for example, represents the shortest distance between symmetry vertices of adjacent lenses or lenticular features. Note that if the adjacent lenses are tilted at different angles α, then a line segment that connects one symmetry vertex to the other symmetry vertex may not be parallel to the plane of the film (the x-y plane), since the symmetry vertices may lie at different heights or different perpendicular distances relative to the x-y plane. The distance d2 represents the shortest distance between peak vertices of adjacent lenses or lenticular features. Again, if the adjacent lenses are tilted at different angles α, then a line segment that connects one peak vertex to the other peak vertex may not be parallel to the plane of the film (the x-y plane). The distance d3 represents the shortest distance between vertices of adjacent prisms. In exemplary embodiments, the distance d1 may be held constant across the working area of the film, e.g., along the x-axis from one edge of the film to the center of the film and to the opposite edge of the film, even though the tilt angle of the lenses may be tailored to change over that working area as described elsewhere herein. Furthermore, the distance d3 can also be held constant over the working area of the film, even though the tilt angle of the prisms may be tailored to change over the working area as described elsewhere herein. Furthermore, in alternative embodiments the tilted prism may be moved or shifted along the x-direction and/or the z-direction such that the vertex of the tilted prism is higher, lower, to the left, and/or to the right relative to its position shown in FIG. 10.

Figure 11:
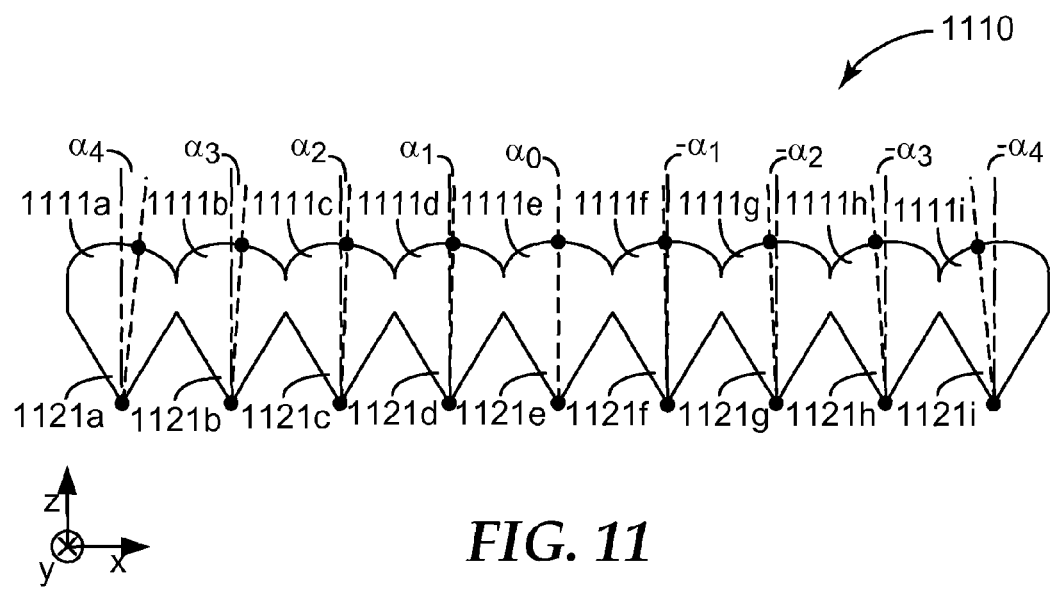
FIGS. 11 and 12 are schematic side or sectional views of light redirecting films that incorporate tilted lenticular features, showing how the amount of tilt changes across the working area of the film.
Figure 12:
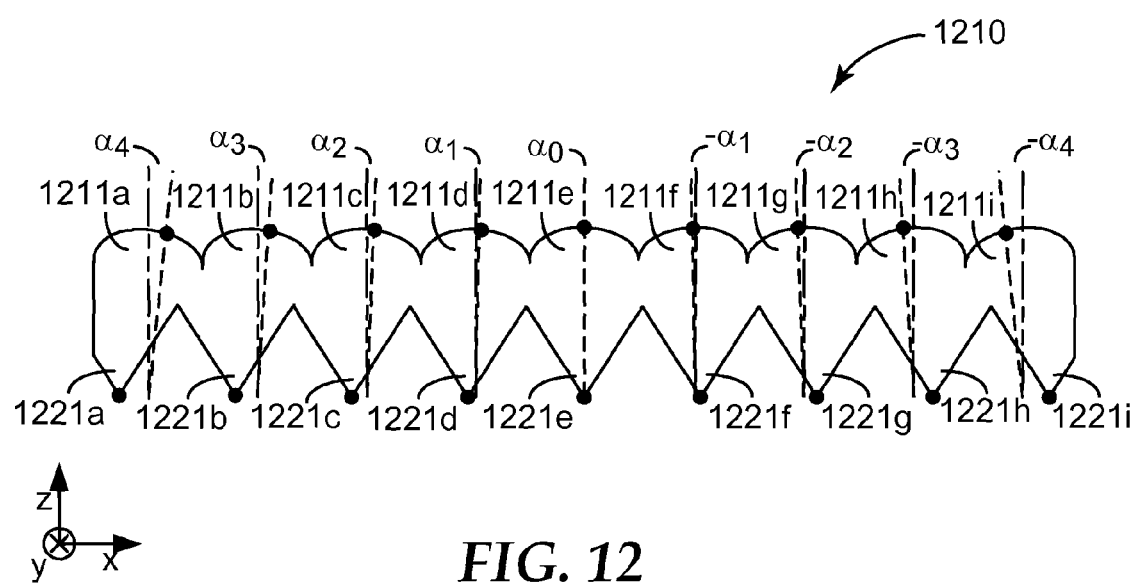

FIGS. 11 and 12 are schematic side or sectional views of 3D light redirecting films that incorporate lenticular features that are both tilted and compoundly curved, showing how the amount of tilt can be tailored to change across the working area of the film. In these embodiments, the structured surfaces and the individual lenticular and prismatic features are assumed to extend into and out of the plane of the figure, i.e., along the y-axis of the reference coordinates. Although a relatively small number of lenticular features, prismatic features, and optical elements are shown in FIGS. 11 and 12, the reader will understand that an actual 3D optical film would typically have many more optical elements than are depicted in these figures.

FIG. 11 illustrates schematically an exemplary 3D light redirecting film 1110 having optical elements corresponding to lens/prism pairs 1111a/1121a, 1111b/1121b, 1111c/1121c, 1111d/1121d, 1111e/1121e, 1111f/1121f, 1111g/1121g, 1111h/1121h, and 1111i/1121i. The lenses 1111a-1111i have compound curvatures such as that shown in FIG. 5 or 7, or of any other suitable shape. Dark circles or dots have been drawn on each lens to represent the symmetry vertex of the lens (refer to symmetry vertex SV in FIG. 7). A dashed line passing through each symmetry vertex represents the axis of symmetry or optical axis of the corresponding lens. Each lens on one structured surface of the film 1110 is registered to a corresponding prism on the opposing structured surface of the film. Dark circles or dots have also been drawn on the vertex of each prism in FIG. 11, which prisms may or may not be tilted as described elsewhere herein. The film 1110 is tailored such that the optical axis of each lens passes through the vertex of its corresponding prism. Furthermore, the optical axes of the lenses are tilted according to an ordered sequence as shown by the angles α4, α3, α2, α1, α0, −α1, −α2, −α3, and −α4. With this sequence, the amount of tilt α of the lenticular features proceeds monotonically from larger values to smaller values as one moves from the left edge of the film to the center of the film, with the tilt angle α=α0 being very small or substantially zero at the center of the film, the amount of tilt thereafter monotonically proceeding from smaller values to larger values (but of opposite polarity) as one proceeds from the center of the film to the right edge of the film.

FIG. 12 shows schematically an exemplary 3D light redirecting film 1210 that is similar to the film of FIG. 11, but where the ratio of the lens-to-lens distance to the prism-to-prism distance has been changed such that the lens for some of the optical elements is offset to some extent relative to its corresponding prism. The film 1210 thus has optical elements corresponding to lens/prism pairs 1211a/1221a, 1211b/1221b, 1211c/1221c, 1211d/1221d, 1211e/1221e, 1211f/1221f, 1211g/1221g, 1211h/1221h, and 1211i/1221i. Similar to lenses 1111a-1111i, the lenses 1211a-1211i have compound curvatures, and dark circles or dots have been drawn on each lens to represent the symmetry vertex of the lens. A dashed line again passes through each symmetry vertex to represent the axis of symmetry or optical axis of the corresponding lens. Despite an offset for some of the optical elements, each lens on one structured surface of the film 1210 is registered to a corresponding prism on the opposing structured surface of the film. Dark circles or dots have also been drawn on the vertex of each prism in FIG. 12, which prisms may or may not be tilted as described elsewhere herein. The film 1210 is tailored such that the optical axis of each lens that is tilted (i.e., all lenses shown in the figure except for lens 1221e) does not pass through the vertex of its corresponding prism. Furthermore, the optical axes of the lenses are tilted according to the ordered sequence described above, i.e., the sequence of angles α4, α3, α2, α1, α0, −α1, −α2, −α3, and −α4.

Figure 13:
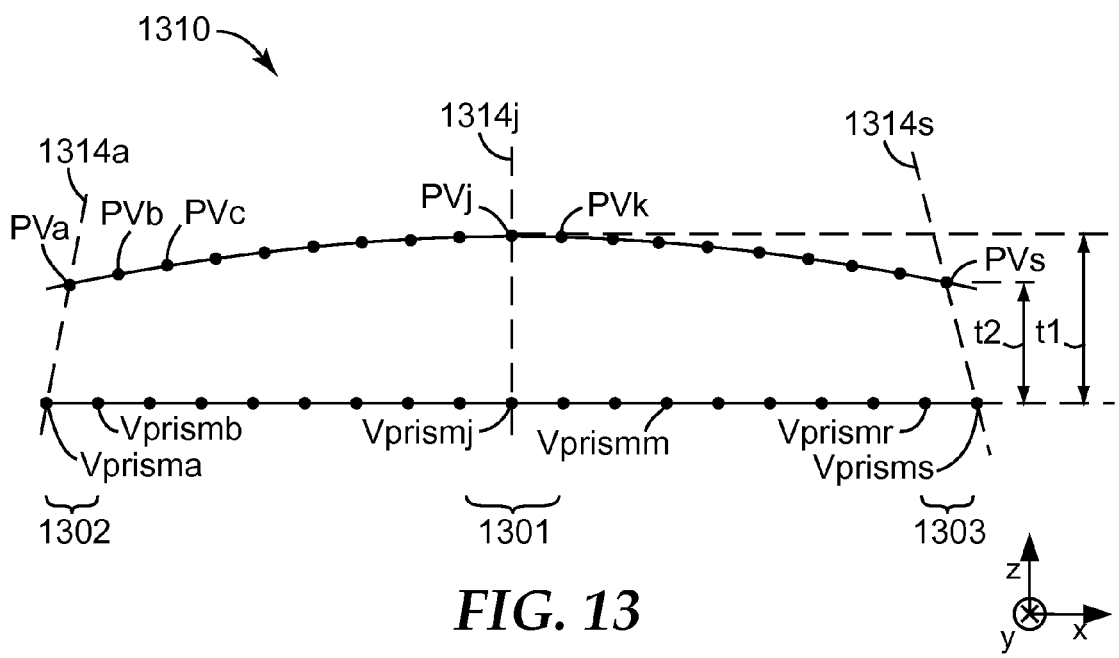
FIG. 13 is a schematic side or sectional representation of a light redirecting film, showing only the peak vertices of the lenticular features and the prism vertices of the corresponding prismatic features, demonstrating how the thickness or caliper of the film can change across the working area of the film.

FIG. 13 is a schematic side or sectional representation of a 3D light redirecting film 1310, this schematic view showing only the peak vertices (PV) of the lenticular features and the prism vertices (Vprism) of the corresponding prismatic features, demonstrating how the thickness or caliper of the film can change across the working area of the film. The film 1310 lies in a film plane parallel to the x-y plane, has a first structured surface of linear lenticular features, and has a second structured surface of linear prismatic features, the lenticular features being paired with the prismatic features such that a one-to-one correspondence of prismatic features and lenticular features is made, each pair of one lenticular feature and one prismatic feature being referred to as an optical element. Each of the lenticular features has a compound curvature, an optical axis, a symmetry vertex, and a peak vertex. The peak vertices of the lenticular features are labeled from a left edge or portion 1302 of the film, to a center portion 1301 of the film, to a right edge or portion 1303 of the film, in a sequence PVa, PVb, PVc, . . . , PVj, . . . , PVs as shown. Similarly, the vertices of the prismatic features are labeled in corresponding fashion in a sequence Vprisma, Vprismb, . . . , Vprismj, . . . , Vprismm, . . . , Vprismr, and Vprisms. Thus, for example, the left-most optical element of the film 1310 includes PVa and Vprisma, the optical element at the center of the film includes PVj and Vprismj, and the right-most optical element of the film includes PVs and Vprisms. Similar to the film of FIG. 11, the film 1310 is tailored such that the optical axis of each lenticular feature passes through the vertex of its corresponding prismatic feature. Furthermore, the optical axes of the lenticular features (see representative optical axes 1314a, 1314j, and 1314s) are tilted according to an ordered sequence whereby the amount of tilt α of the lenticular features proceeds monotonically from larger values to smaller values as one moves from the left portion 1302 of the film to the center portion 1301 of the film, with the tilt angle α being very small or substantially zero at the center portion, the amount of tilt thereafter monotonically proceeding from smaller values to larger values (but of opposite polarity) as one proceeds from the center portion 1301 to the right portion 1303 of the film. The prismatic features are preferably tilted by amounts that are proportional to the amount of tilt of their corresponding lenticular features, as shown in FIG. 9*d*. Alternatively, the prismatic features of film 1310 may not be tilted, as shown in FIG. 9*b*.

Although the sequence of tilt angles and the thickness profile from the center portion of the film to each edge portion are assumed to be monotonic in FIG. 13, other non-monotonic functions can also be used as discussed above.

The 3D film 1310 is preferably designed such that the distance from the symmetry vertex of a given lenticular feature to the vertex of its corresponding prismatic feature is substantially the same for all optical elements. This ensures good optical performance for all of the optical elements across the working area of the film. However, since (i) the lenticular features at different places on the film are tilted by different amounts, and (ii) the lenticular features are assumed to have the same compoundly curved shape, and (iii) the height of the peak vertex of a compoundly curved lenticular feature above the plane of the film decreases as the tilt angle increases, the optical design produces a profile of peak vertices and prism vertices shown in FIG. 13. The prism vertices remain in a plane parallel to a film plane, but the peak vertices of the lenticular features follow an envelope or curve that is highest at the center portion 1301 of the film 1310 and is lowest at the left portion 1302 and right portion 1303 of the film 1310. This results in an overall film thickness or caliper that is greatest (t1) at the center portion 1301 of the film, and least (t2) at the edges of the film, i.e., at the left portion 1302 and right portion 1303.

In an alternative embodiment to that of FIG. 13, the lenticular features and prismatic features can be shifted along the z-axis in a way that maintains a constant distance between the symmetry vertex of the lenticular feature and the vertex of its corresponding prismatic feature, where more shifting occurs at the edges of the film than at the center of the film. The resulting 3D film still incorporates tilting of the lenticular features according to the same ordered sequence as that of FIG. 13, but the peak vertices of the lenticular features may be made to all lie in a plane parallel to the film plane, while the prism vertices follow an envelope or curve that is lowest at the center portion of the film and highest at the edges of the film. This again results in an overall film thickness or caliper that is greatest (t1) at the center portion of the film, and least (t2) at the edges of the film. In a related alternative embodiment, the shifting of the lenticular and prismatic features can be done in a way that results in neither the peak vertices of the lenticular features nor the prism vertices all lying in a plane; rather, both sets of vertices may follow an envelope or curve that bows away from the film plane at the center of the film. This embodiment too results in an overall film thickness or caliper that is greatest (t1) at the center portion of the film, and least (t2) at the edges of the film.

MODELED EXAMPLES

As mentioned above, we have found that 3D film designs that are free to incorporate not only rotated or tilted lenticular features but also rotated or tilted prismatic features can provide a number of potential performance benefits, including increased toe-in angles and sharper stereoedges at high toe-in angles.

Various 3D light redirecting film designs, or portions of such films, were modeled and evaluated using commercially available optical design software, namely, TracePro Expert (version 6.0.0) software available from Lambda Research Corporation. For the modeled examples, a three-layer construction similar to that of FIG. 10 was assumed: an interior flat film, a molded lenticular layer disposed on one major surface of the interior film, and a molded prismatic layer disposed on the opposite major surface of the interior film. The flat interior film was assumed to have a thickness of 76.2 microns (3 mils) and a refractive index of 1.67, which is consistent with a film made of polyethylene terephthalate (PET). The prism layer and the lenticular layer were both assumed to have a refractive index of 1.51, which is consistent with a layer of a cured blended acrylate consisting of monomer(s), oligomer(s) and photoinitiator(s) yielding a cured material giving adequate physical properties for the application. The prismatic features were assumed to be contiguous with each other, i.e., separated by v-shaped portions rather than flattened portions. The prismatic features were also assumed to have an included angle at the prism vertex of 60 degrees. The lenticular features were sometimes assumed to have a compound curvature and other times were assumed to have a simple curvature with a radius of curvature of 59 microns. The compound curvature, when used for the lenticular features, assumed an axial radius of curvature of 59 microns, and a change in curvature to a radius of approximately 59.9 microns at the outer portions or valleys of the lenticular feature (see e.g. valley 428 in FIG. 4). The centers of curvature for the outer portions of the lenticular feature (see points C2 and C3 in FIG. 5) were disposed at points that were approximately 1.7 microns lower (1.7 microns in the −z direction in FIG. 5) and 0.03 microns laterally displaced (0.03 microns in the −x direction for the positive (+x) side of the lens (see point C2 in FIG. 5), and 0.03 microns in the +x direction for the negative (−x) side of the lens (see point C3 in FIG. 5)) relative to the axial center of curvature. The pitch of the prismatic features was assumed to be 78 microns, and the pitch of the lenticular features was also 78 microns. Each of the three distinct layers making up the modeled film was assumed to be isotropic and homogeneous. Various rotation angles α (for the lenticular features) and β (for the prismatic features) were modeled, including α=β=0, and in all cases the rotation angles α and β were assumed to pivot about the vertex of the prism, with no additional translational movement.

In order to simplify the model and to avoid unnecessary complications associated with the design of the autostereoscopic backlight, we modeled the different light sources being separately illuminated (see FIGS. 1*a* and 1*b*, items 122 and 124) by defining two short line sources of light on opposite sides of a single prism vertex that could be separately "energized" using the modeling tool. A first short line source stretched from the vertex of the given (single) prism to the vertex of an adjacent prism on one side of the given prism. A second short line source stretched from the vertex of the given (single) prism to the vertex of an adjacent prism on the opposite side of the given prism. Tracing rays originating from the first short line source allowed us to simulate one light source (e.g. item 124 in FIG. 1*a*) being energized, and tracing rays originating from the second short line source allowed us to simulate the other light source (item 122 in FIG. 1*b*) being energized. Each of the short line sources was a modeled as a random grid Gaussian beam, source half angle of 20 degrees, with an average propagation direction of 70 degrees relative to the z-axis and toward the given (single) prism. Ten thousand (10,000) rays were traced for each of these short line sources independently, with the ray splitting feature off, and the rays were all traced through the modeled film system and the data was collected and analyzed. The data was taken from the polar iso candela plot in the TracePro software. This data was then imported into a computer spreadsheet (Microsoft™ Excel) and divided by the cosine of the angle to convert from radiant intensity to radiance, in units of $W/(sr\ m^2)$). The result was a pair of simulated light beam distributions for each 3D film geometry that was modeled. Each simulated light beam—one representing the left eye beam "L" as emitted from the 3D film and the other representing the right eye beam "R" as emitted from the 3D film—was a plot of radiance versus the observation angle in degrees relative to the z-axis.

Figure 14:
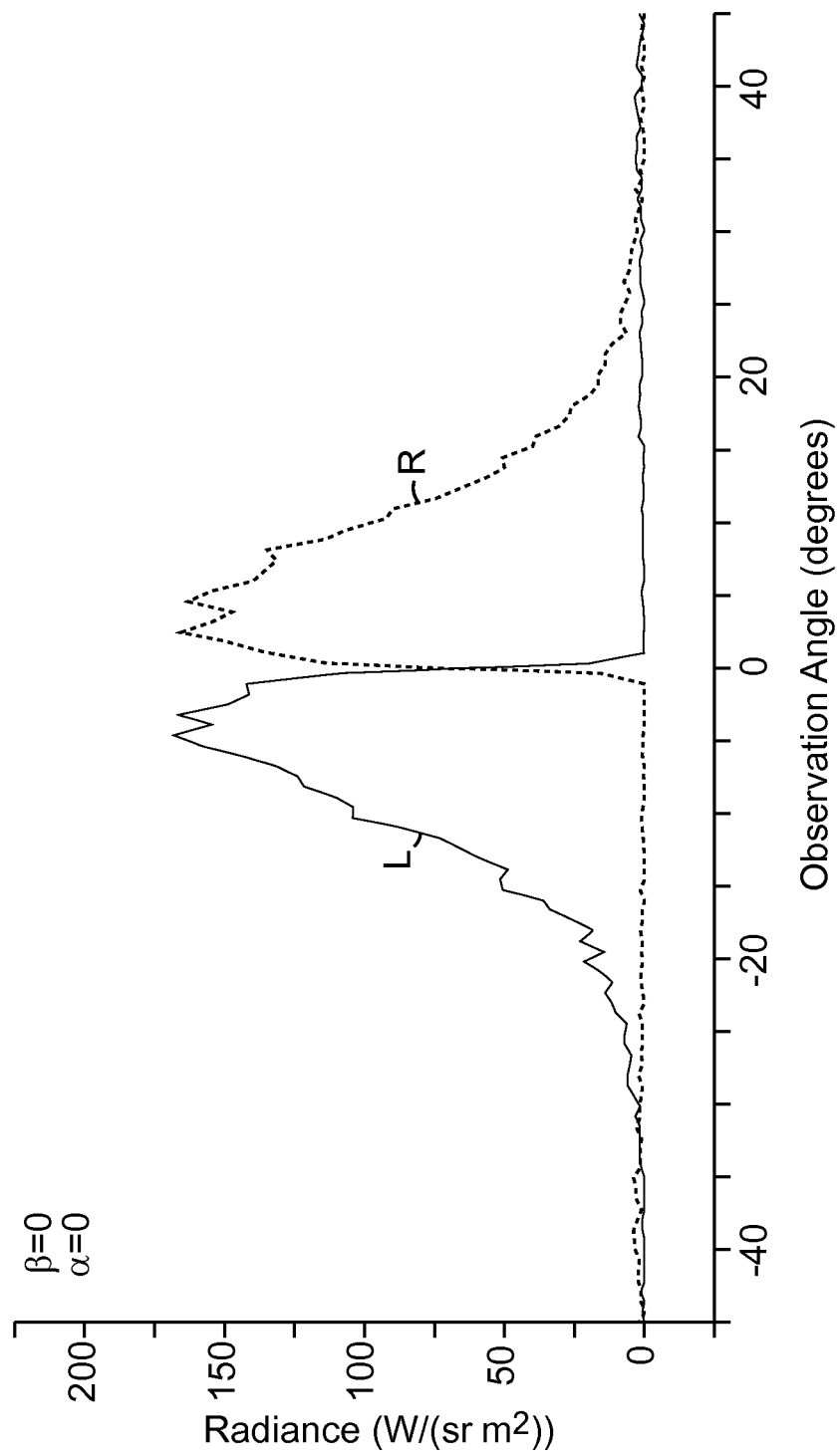
FIG. 14 is a graph of modeled radiance versus observation angle for light emitted from a portion of a light redirecting film in an autostereoscopic backlight system, the light redirecting film portion having identical lenticular features with compound curvature and also having corresponding identical prismatic features, the lenticular features having no tilt ($\alpha=0$) and the prismatic features also having no tilt ($\beta=0$)
Figure 14A:
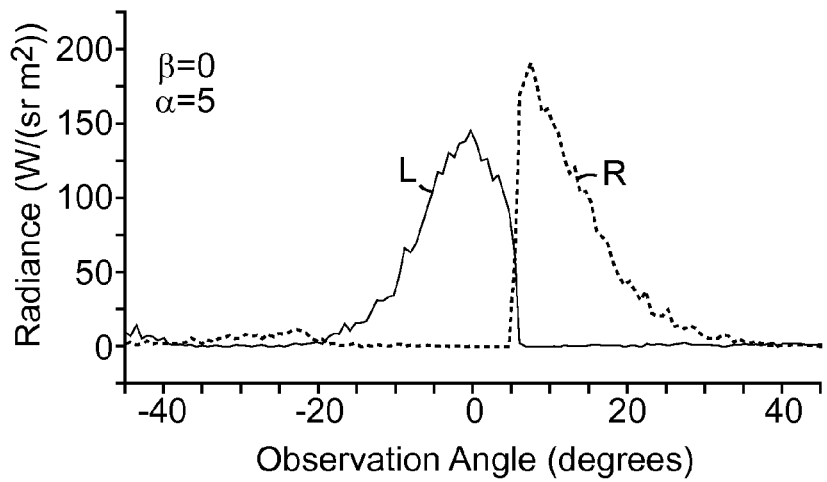
FIGS. 14a through 14i are graphs of modeled radiance similar to that of FIG. 14, but for different values of the tilt angles α and β.
Figure 14B:
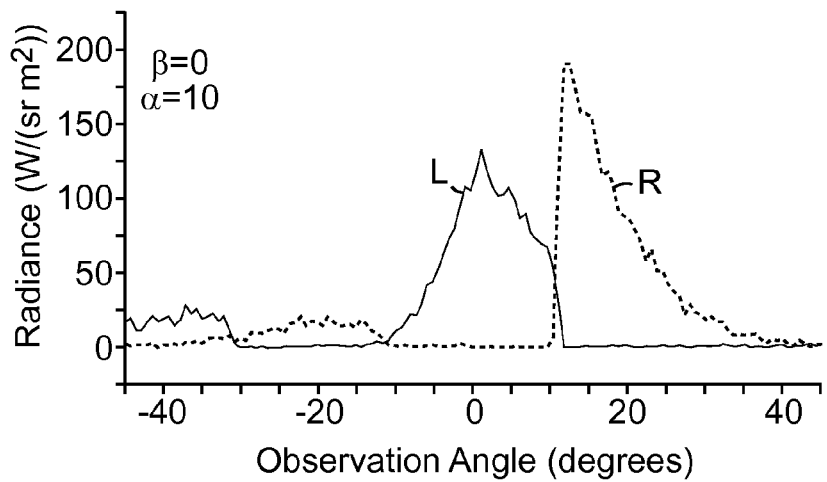
Figure 14C:
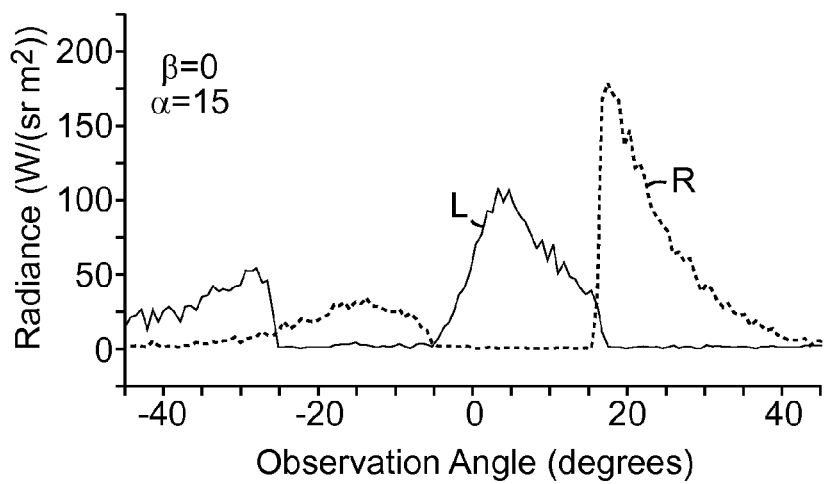
Figure 14D:
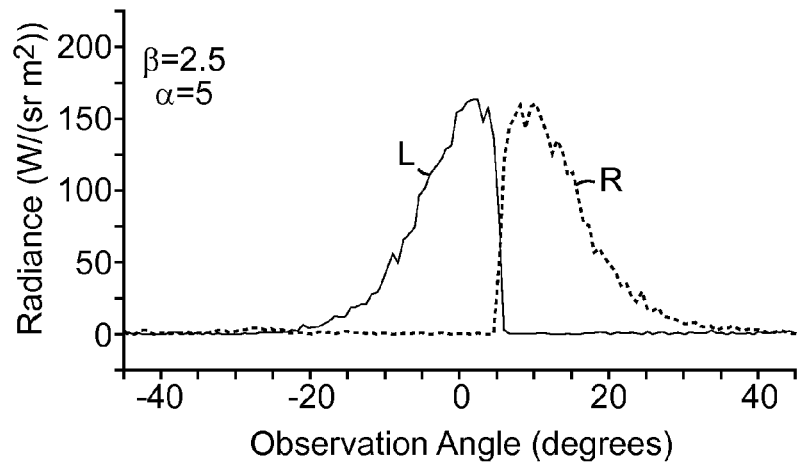
Figure 14E:
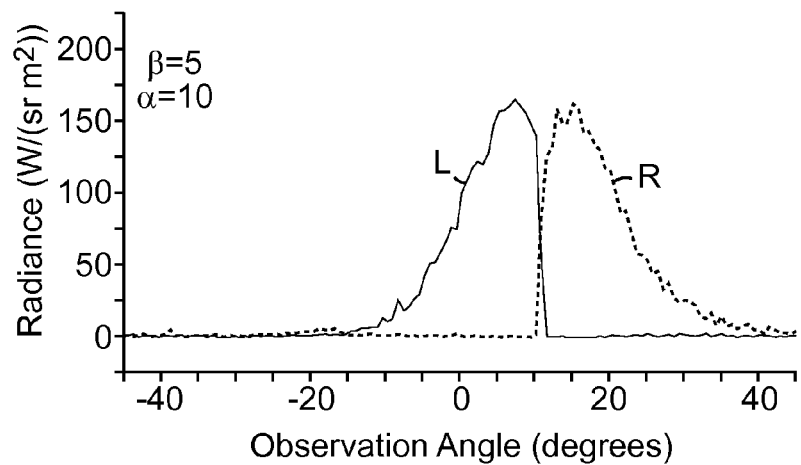
Figure 14F:
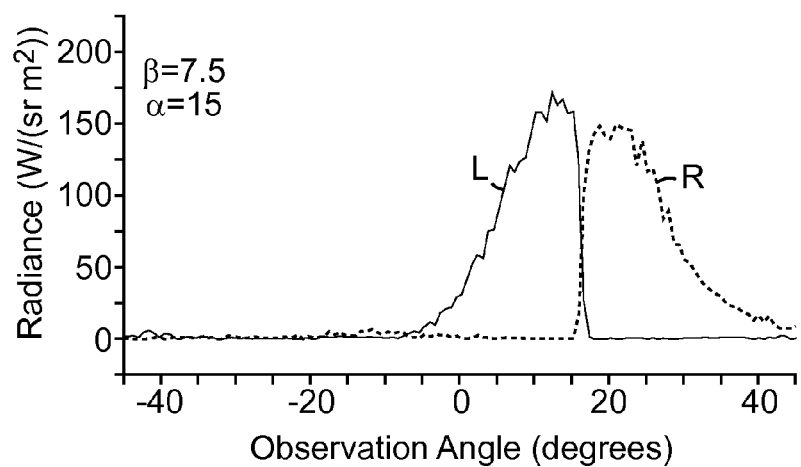
Figure 14G:
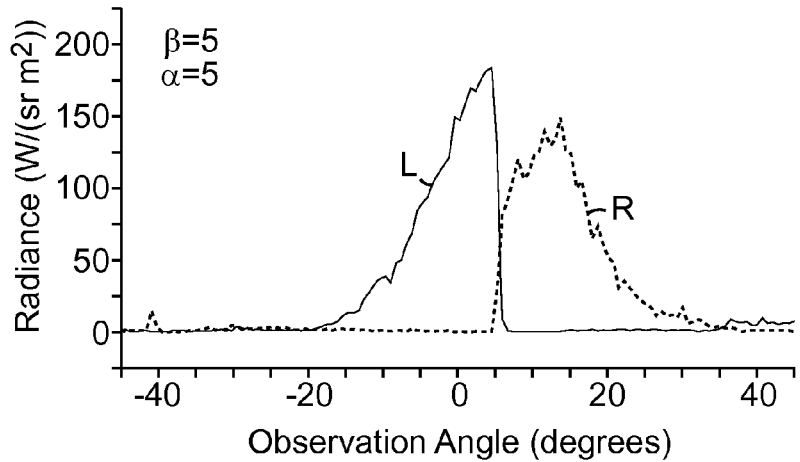
Figure 14H:
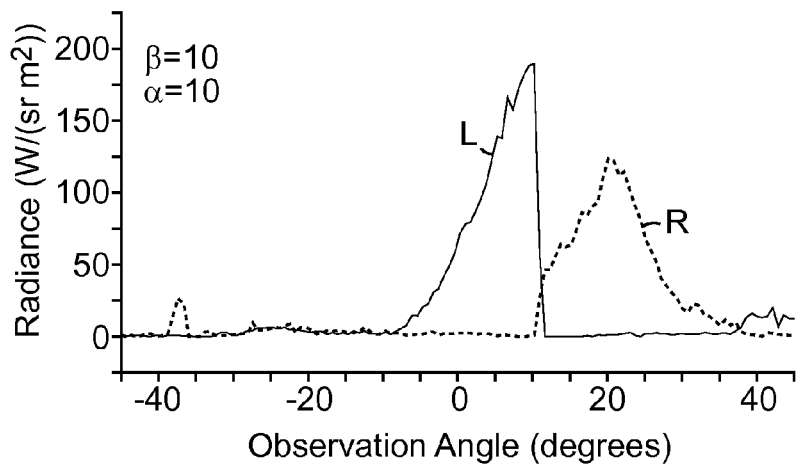
Figure 14I:
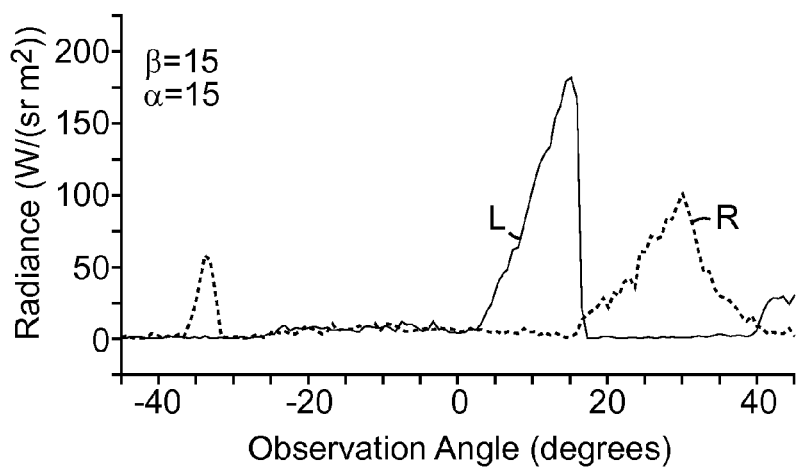

In the course of performing this modeling we also observed ray trace plots of different 3D light redirecting film designs and were able to observe the effect of tilting the prismatic features by different amounts $\beta$ for a given lenticular feature that had been rotated by a given amount $\alpha$. From the ray trace plots we observed that for certain rotations $\beta$ of the prismatic features, a large proportion of the light injected into the given (single) prismatic feature from the short line source would "miss" the lenticular feature that was associated with the given prismatic feature (as part of the same optical element), and would instead propagate to other optical elements and in many cases emerge from the 3D film at angles that correspond to crosstalk. This was observed, for example, for a 3D film embodiment using the compoundly curved lenticular features having a rotation angle $\alpha=15$ degrees and a prism rotation angle $\beta=0$ degrees, and also for the same 3D film embodiment but where $\beta=15$ degrees. For other rotations $\beta$ of the prismatic features, substantially less light was observed to "miss" the lenticular feature associated with the given (single) prismatic feature, and substantially less light that constitutes crosstalk was observed in the ray trace plots. This was observed, for example, for a 3D film embodiment using the compoundly curved lenticular features having a rotation angle $\alpha=15$ degrees and a prism rotation angle $\beta=7.5$ degrees A first set of modeling information was generated for 3D film designs that used lenticular features having the compound curvature described above for the modeling. For the initial design in this modeling set, the lenticular features and the prismatic features were both assumed to have no rotation or tilt, i.e., $\alpha=\beta=0$. The modeling results for this 3D film design are shown in FIG. 14, where "L" identifies the left eye beam emitted from the 3D film and "R" identifies the right eye beam emitted from the 3D film. Different variations of this design were then modeled, where the only parameters changed were the rotation angles $\alpha$ (for the compoundly-curved lenticular features) and $\beta$ (for the prismatic features). The results are shown in FIGS. 14a through 14i, where the values used for $\alpha$ and $\beta$ for each particular embodiment are labeled on each graph, and the calculated left and right eye beams are plotted.

By comparing FIGS. 14a through 14i, we see the effects of rotating the prism. When the prism is rotated too little or too much relative to the rotation angle of the lenticular feature, the stereo lobes are distorted. The stereoedge also degrades depending on the sidedness of the sources (e.g., left light source versus right light source). But when the prism is rotated at about half the angle of the lenticular feature, the sharpness of the stereoedge is maintained throughout, and the spurious peaks can be minimized.

Figure 15:
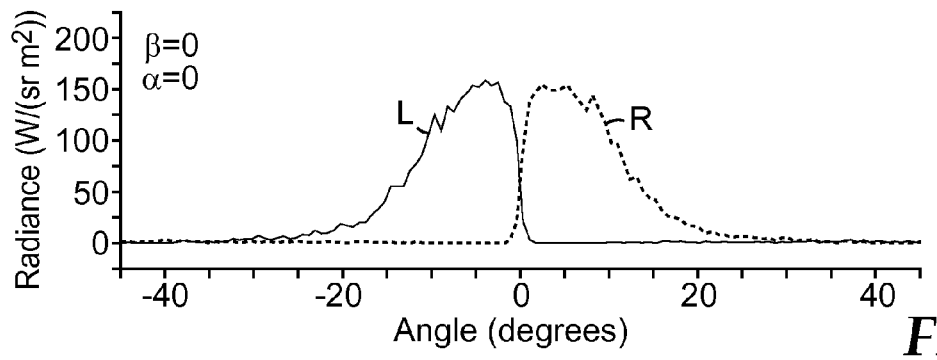
FIG. 15 is a graph of modeled radiance versus observation angle for light emitted from a portion of a light redirecting film in an autostereoscopic backlight system, the light redirecting film portion having identical lenticular features with simple (constant) curvature and also having corresponding identical prismatic features, the lenticular features having no tilt ($\alpha=0$) and the prismatic features also having no tilt ($\beta=0$)
Figure 15A:
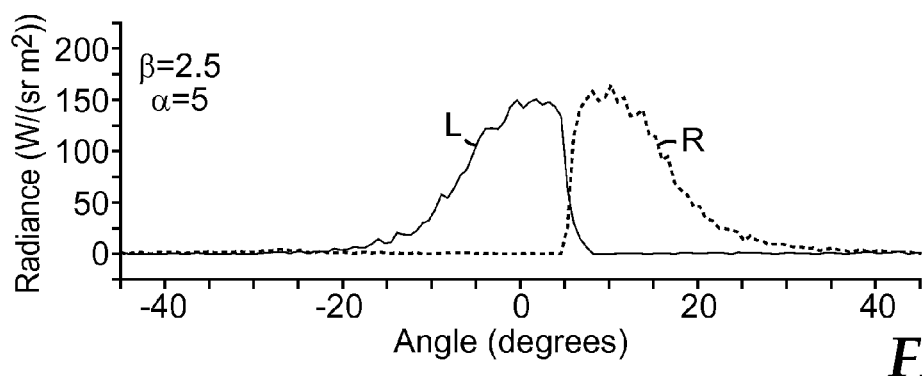
FIGS. 15a through 15c are graphs of modeled radiance similar to that of FIG. 15, but for different values of the tilt angles α and β.
Figure 15B:
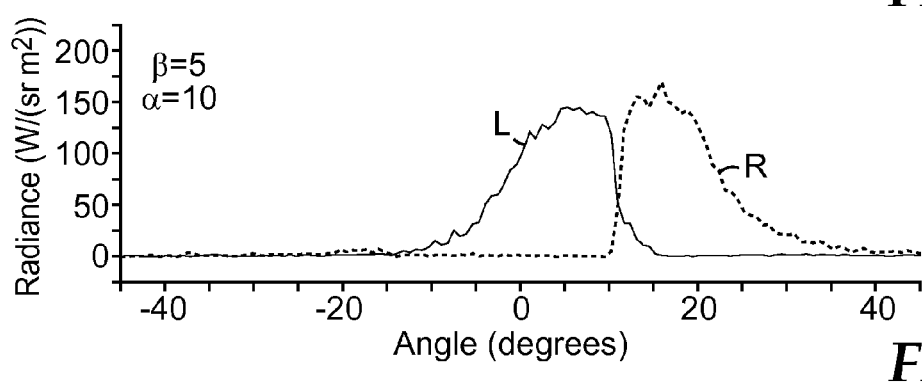
Figure 15C:
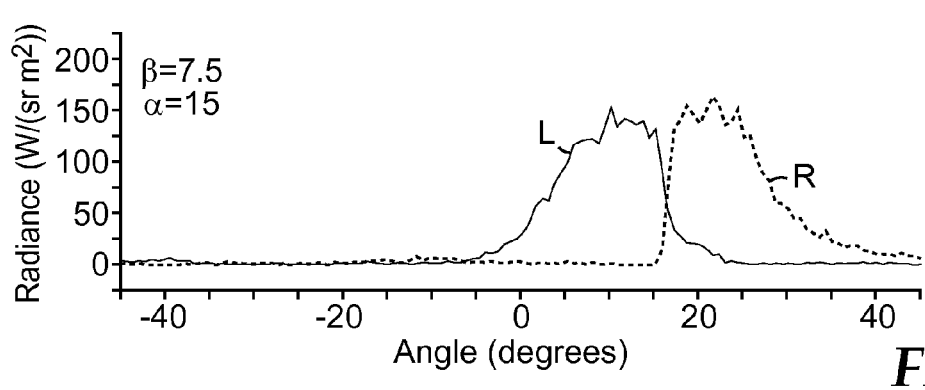

A second set of modeling information was then generated for 3D film designs that used lenticular features having the simple curvature described above for the modeling. For the initial design in this modeling set, the lenticular features and the prismatic features were both assumed to have no rotation or tilt, i.e., $\alpha=\beta=0$. The modeling results for this 3D film design are shown in FIG. 15, where "L" again identifies the left eye beam emitted from the 3D film and "R" again identifies the right eye beam emitted from the 3D film. Different variations of this design were then modeled, where the only parameters changed were the rotation angles $\alpha$ (for the compoundly-curved lenticular features) and $\beta$ (for the prismatic features). The results are shown in FIGS. 15a through 15c, where the values used for $\alpha$ and $\beta$ for each particular embodiment are labeled on each graph, and the calculated left and right eye beams are plotted.

By comparing FIGS. 15a, 15b, 15c and FIGS. 14d, 14e, 14f, we see the effects of using a compoundly-curved lenticular feature relative to a simply curved lenticular feature. The simply curved lenticular feature has spherical aberration, which has increasingly detrimental effects on the optical performance of the film as the rotation angles become larger. The stereoedge of the left eye beam "L" also degrades as the rotation angles become larger. Despite these negative effects, the ability of the 3D film design that uses the simply curved lenticular features to toe-in the light is still improved by incorporating the rotated or tilted prismatic features.

Unless otherwise indicated, all numbers expressing feature sizes, amounts, physical properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application.

As used herein, the term "microstructure" or "microstructured" refers to surface relief features that have at least one dimension that is less than one millimeter. In many embodiments the surface relief features have at least one dimension that is in a range from 50 nanometers to 500 micrometers.

Various modifications and alterations of this invention will be apparent to those skilled in the art without departing from the scope and spirit of this invention, and it should be understood that this invention is not limited to the illustrative embodiments set forth herein.

The invention claimed is:

1. A light redirecting film configured to be used in an autostereoscopic backlight, the film defining a plane and having opposed first and second structured surfaces along the plane, the first structured surface comprising lenticular features and the second structured surface comprising prismatic features, wherein each of the prismatic features has a prism optical axis, and wherein the prismatic features include a first plurality of prismatic features, where a first one of the prismatic features of the first plurality has a first prism optical axis that is tilted relative to a thickness axis of the film perpendicular to the plane and a second one of the prismatic features has a second prism optical axis that is substantially parallel to the thickness axis, and wherein the first plurality of prismatic features are arranged such that they have respective amounts of tilt that change across the film from larger values at the first prismatic feature of the first plurality to smaller values at the second prismatic feature.

2. The film of claim 1, wherein the lenticular features each extend parallel to an in-plane lenticular axis, and the prismatic features each extend parallel to an in-plane prismatic axis, the in-plane prismatic axis being perpendicular to the second prism optical axis.

3. The film of claim 1, wherein the first prism optical axis is tilted at an angle $\beta$ relative to the thickness axis, and wherein $\beta$ is in a range from −30 to +30 degrees.

4. The film of claim 1, wherein the prismatic features include a second plurality of prismatic features including a third one of the prismatic features having a third prism optical axis that is tilted relative to the thickness axis, and wherein the tilt of the first prism optical axis is of opposite polarity to the tilt of the third prism optical axis.

5. The film of claim 4, wherein the second prismatic feature is disposed between the first and third prismatic features.

6. The film of claim 1, wherein the lenticular features have compound curvatures, and each of the lenticular features has a lenticular optical axis.

7. The film of claim 6, wherein a first one of the lenticular features has a first lenticular optical axis that is tilted relative to the thickness axis.

8. The film of claim 7, wherein the first lenticular optical axis is tilted at an angle $\alpha$ relative to the thickness axis, and wherein $\alpha$ is in a range from −30 to +30 degrees.

9. The film of claim 8, wherein a second one of the lenticular features has a second lenticular optical axis that is substantially parallel to the thickness axis.

10. The film of claim 9, wherein a third one of the lenticular features has a third lenticular optical axis that is tilted relative to the thickness axis, and wherein the tilt of the first lenticular optical axis is of opposite polarity to the tilt of the third lenticular optical axis.

11. The film of claim 10, wherein the second lenticular feature is disposed between the first and third lenticular features.

12. The film of claim 7, wherein the first lenticular feature is paired with the first prismatic feature, wherein the first prism optical axis is tilted at an angle $\beta$ relative to the thickness axis, wherein the first lenticular optical axis is tilted at an angle $\alpha$ relative to the thickness axis, and wherein the magnitude of $\beta$ is greater than zero but less than the magnitude of $\alpha$.

13. The film of claim 12, wherein the magnitude of $\beta$ is about half the magnitude of $\alpha$.

14. A light redirecting film configured to be used in an autostereoscopic backlight, the film defining a plane and having opposed first and second structured surfaces, the first structured surface comprising lenticular features and the second structured surface comprising prismatic features, the film having a central film thickness at a central portion of the film and a first edge film thickness at a first edge portion of the film, the central film thickness being greater than the first edge film thickness.

15. The film of claim 14, wherein the lenticular features each extend parallel to an in-plane lenticular axis, and wherein the film has a film thickness that changes along a given in-plane axis perpendicular to the in-plane lenticular axis.

16. The film of claim 15, wherein the film thickness decreases monotonically along the given in-plane axis from the central portion of the film to the first edge portion of the film.

17. The film of claim 16, wherein the film has a second edge portion opposite the first edge portion, and wherein the film thickness also decreases monotonically along the given in-plane axis from the central portion of the film to the second edge portion of the film.

18. The film of claim 14, wherein each of the prismatic features has a prism optical axis, and wherein a first one of the prismatic features has a first prism optical axis that is tilted relative to a thickness axis of the film perpendicular to the plane.

19. The film of claim 14, wherein the lenticular features have compound curvatures, and each of the lenticular features has a lenticular optical axis, and wherein a first one of the lenticular features has a first lenticular optical axis that is tilted relative to a thickness axis of the film.

20. The film of claim 14, wherein a first one of the prismatic features has a first prism optical axis that is tilted relative to a thickness axis of the film perpendicular to the plane, wherein the lenticular features have compound curvatures, and each of the lenticular features has a lenticular optical axis, wherein a first one of the lenticular features has a first lenticular optical axis that is tilted relative to the thickness axis, wherein the first lenticular feature is paired with the first prismatic feature, wherein the first prism optical axis is tilted at an angle $\beta$ relative to the thickness axis, wherein the first lenticular optical axis is tilted at an angle $\alpha$ relative to the thickness axis, and wherein the magnitude of $\beta$ is greater than zero but less than the magnitude of $\alpha$.

* * * * *